(12) United States Patent
Kagechi et al.

(10) Patent No.: US 7,085,379 B1
(45) Date of Patent: Aug. 1, 2006

(54) IMAGE COMPRESSION DEVICE AND IMAGE DECOMPRESSING DEVICE, AND COMPUTER-READABLE RECORDED MEDIUM ON WHICH PROGRAM FOR ALLOWING COMPUTER TO EXECUTE IMAGE COMPRESSING METHOD AND IMAGE DECOMPRESSING METHOD

(75) Inventors: Kensaku Kagechi, Tenri (JP); Hisashi Saiga, Yamatokoriyama (JP); Keisuke Iwasaki, Ikoma-gun (JP)

(73) Assignee: Sharp Kabushiki Kaisha, Osaka (JP)

( * ) Notice: Subject to any disclaimer, the term of this patent is extended or adjusted under 35 U.S.C. 154(b) by 660 days.

(21) Appl. No.: 10/130,925

(22) PCT Filed: Nov. 15, 2000

(86) PCT No.: PCT/JP00/08060

§ 371 (c)(1),
(2), (4) Date: May 23, 2002

(87) PCT Pub. No.: WO01/39511

PCT Pub. Date: May 31, 2001

(30) Foreign Application Priority Data

Nov. 26, 1999 (JP) ................................ 11-336233

(51) Int. Cl.
*G06K 9/00* (2006.01)
(52) U.S. Cl. ....................... 380/166; 382/232; 380/269
(58) Field of Classification Search ........ 382/162–167, 382/232–245, 100, 166, 249, 251, 253; 358/1.2, 358/515, 518, 500, 520, 539, 426.03, 426.04, 358/426.07; 704/500, 503, 222, 230; 380/217, 380/269; 375/240.03, 240.22, 240.25, 243, 375/245
See application file for complete search history.

(56) References Cited

U.S. PATENT DOCUMENTS 4,319,267 A 3/1982 Mitsuya et al.

(Continued)

FOREIGN PATENT DOCUMENTS

EP 0 261 561 3/1988

(Continued)

OTHER PUBLICATIONS

Proceedings of the IEEE, vol. 68, No. 3 (1980), Arun N. Netravale, "Picture Coding: A Review", pp. 366-406.

(Continued)

*Primary Examiner*—Jingge Wu
*Assistant Examiner*—Abolfazl Tabatabai
(74) *Attorney, Agent, or Firm*—Peter J. Manus; David G. Conlin; Edwards Angell Palmer & Dodge LLP

(57) ABSTRACT

An image compression apparatus capable of efficiently encoding an image without causing color deviation to the eye compresses luminance element image data and two types of chrominance element image data each consisting of a plurality of blocks. The image compression apparatus includes: a resolution determination processing section (38, 142) adaptively setting a resolution of each block during reduction according to a predetermined criterion for each of the luminance element image data and the two types of chrominance element image data, and creating resolution information; a data creation processing section (44) connected to the resolution determination processing section (38, 142), and creating data having each block reduced based on the resolution information for each of the luminance element image data and the two types of chrominance element image data; and an encoder (42, 48A, 48B) connected to the resolution determination section (38, 142) and the data creation processing section (44), and encoding an output of each of the resolution information and the data creation processing section (44).

14 Claims, 20 Drawing Sheets

U.S. PATENT DOCUMENTS

| | | | |
|---|---|---|---|
| 4,743,959 A | * | 5/1988 | Frederiksen ............ 375/240.25 |
| 5,068,746 A | * | 11/1991 | Ohsawa et al. ............. 358/443 |
| 5,359,438 A | | 10/1994 | Maeda |
| 5,483,358 A | * | 1/1996 | Sugiura et al. ............. 358/508 |
| 5,543,939 A | * | 8/1996 | Harvey et al. ......... 375/240.02 |
| 5,915,079 A | * | 6/1999 | Vondran et al. ............ 358/1.15 |

FOREIGN PATENT DOCUMENTS

| | | |
|---|---|---|
| EP | 0 608 618 | 8/1994 |
| JP | 63296583 | 12/1988 |
| JP | 01-245683 | 9/1989 |
| JP | 03293381 | 12/1991 |
| JP | 07221993 | 8/1995 |
| JP | 10173913 | 6/1998 |
| JP | 11-032337 | 2/1999 |

OTHER PUBLICATIONS

The Journal of the Institute of Television Engineers of Japan, vol. 39, No. 10 (Oct. 1, 1985), Tanimoto et al., "TAT (Time-Axis Transform) Bandwidth Compression System for High-Definition Television", pp. 934(84)-940(90).

IEEE Proc.—Vis. Image Signal Process, vol. 146, No. 1 (Feb. 1999), Tsang et al., "Encoding of Colour Images Using Adaptive Decimation and Interpolation", pp. 50-56.

* cited by examiner

IMAGE COMPRESSION DEVICE AND IMAGE DECOMPRESSING DEVICE, AND COMPUTER-READABLE RECORDED MEDIUM ON WHICH PROGRAM FOR ALLOWING COMPUTER TO EXECUTE IMAGE COMPRESSING METHOD AND IMAGE DECOMPRESSING METHOD

TECHNICAL FIELD

The present invention relates to an image compression apparatus, an image expansion apparatus and a computer readable recording medium recording programs for allowing a computer to execute an image compression method and an image expansion method, respectively. The present invention particularly relates to an image compression apparatus and an image expansion apparatus capable of efficiently encoding an image without color deviation to the eye and to a computer readable recording medium recording programs for allowing a computer to execute an image compression method and an image expansion method, respectively.

BACKGROUND ART

In respect to image compression, there is disclosed a thinning-out method for thinning out chrominance element data by utilizing the characteristic of human eyes that the human eyes are relatively insensitive to the change of color, by Japanese Patent Laying-Open No. 7-221993(1995). According to this thinning-out method, the rate of change of chrominance elements in a small block is obtained, the chrominance elements are slightly thinned out if the rate of change is high and the chrominance elements are largely thinned out if the rate of change is low, thereby compressing image data.

Generally, however, if chrominance elements are thinned out, there often occurs a phenomenon referred to as 'color deviation phenomenon' that false colors are generated. Such a color deviation phenomenon is particularly conspicuous on edges of a character.

Also, according to a conventional thinning-out method, a thinning-out distance is determined based only on the rate of change of chrominance elements. Due to this, a thinning-out processing is conducted at the same thinning-out distance to a small block consisting of a character having a single color as shown in FIG. 20A and a small block consisting of a graphic form having a plurality of colors as shown in FIG. 20B. If many colors are mixed as shown in FIG. 20B, a person cannot grasp the graphic form in the small block as an object such as a character, with the result that even if color deviation somewhat occurs, the person tends not to notice it. Due to this, in such a case, it must be possible to increase the thinning-out distance.

DISCLOSURE OF THE INVENTION

The present invention has been made to solve the above-stated problems and it is an object of the present invention to provide an image compression apparatus capable of efficiently encoding an image without color deviation to the eye.

It is another object of the present invention to provide an image expansion apparatus for expanding an encoded image without color deviation to the eye.

It is yet another object of the present invention to provide a computer readable recording medium recording a program for allowing a computer to execute an image compression method capable of efficiently encoding an image without color deviation to the eye.

It is yet another object of the present invention to provide a computer readable recording medium recording a program for allowing a computer to execute an image expansion method expanding an encoded image without color deviation to the eye.

An image compression apparatus according to one aspect of the present invention is an image compression apparatus for compressing luminance element image data and two types of chrominance element image data each constituted out of a plurality of blocks, which apparatus includes: a resolution determination processing section adaptively setting a resolution of each block during reduction according to a predetermined criterion for each of the luminance element image data and the two types of chrominance element image data, and creating resolution information; a data creation processing section connected to the resolution determination processing section, and creating data having each block reduced based on the resolution information for each of the luminance element image data and the two types of chrominance element image data; and an encoder connected to the resolution determination section and the data creation processing section, and encoding an output of each of the resolution information and the data creation processing section.

If each block is reduced and then enlarged, the resolution during the reduction is set so as not to cause color deviation to the human eye. Based on the resolution, each block is reduced and encoded for each of the luminance element image data and the two types of chrominance element image data. Due to this, if data is decoded and enlarged and the luminance element image data and the two types of chrominance element image data are obtained, no color deviation occurs to the eye.

Preferably, the resolution determination processing section includes: an image reduction processing section reducing each of the plurality of blocks to have a predetermined resolution by a method same as a method of the data creation processing section; an image enlargement processing section connected to the image reduction processing section, and enlarging each of the blocks reduced by the image reduction processing section to have a resolution same as a resolution before reduction; region error calculation processing section connected to the image enlargement processing section, and detecting an error between the image data in each block outputted by the image enlargement processing section and the image data in each block reduced by the image reduction processing section; and a region resolution creation processing section connected to the region error calculation processing section, determining whether each block can be reduced based on the predetermined resolution based on an output of the region error calculation processing section, and creating the resolution information.

If each block is reduced and then enlarged, the resolution during the reduction is obtained so as not to cause an error. Based on the resolution, each block is reduced and encoded for each of the luminance element image data and the two types of chrominance element image data. Due to this, if data is decoded and enlarged and luminance element image data and two types of chrominance element image data are obtained, no color deviation occurs to the human eye.

Furthermore, it is preferable that the resolution determination processing section includes: a luminance element edge detection processing section detecting edge elements from the luminance element image data; an edge density calculation means, connected to the luminance element edge detection processing section, for calculating a density of the edge elements in each block for each of the plurality of blocks of the luminance element image data; and resolution creation means, connected to the edge density calculation means, for creating the resolution information on the luminance element image data based on the density.

The resolution during the reduction is obtained based on the density of the edges of the luminance element in each block. Generally, a character part has concentrated edges. Due to this, it is highly likely that a block in which edges are not concentrated does not include a character and the block does not often contain the same quantity of information as that of a character for a person. Accordingly, even if slight color deviation occurs, the color deviation is less noticed to the human eye. Even if such a block is reduced, no color deviation occurs to the human eye.

It is more preferable that the resolution determination processing section includes: number-of-colors calculation means for obtaining the number of colors included in each block based on the two types of chrominance element image data; and resolution creation means, connected to the number-of-colors calculation means, for creating the resolution information on each of the two types of chrominance element image data based on an output of the number-of-colors calculation means.

If many colors are mixed in a block, a person cannot recognize a graphic form in the block as an object such as a character. In addition, a character is generally, often expressed with a single color and it is highly likely that the graphic form in the block is not a character. Due to this, even if slight color deviation occurs to a part in which many colors are mixed, the color deviation is less noticed by the human eye. Even if such a block is reduced, no color deviation occurs to the human eye.

Moreover, it is preferable that the resolution determination processing section includes: chrominance element edge detection means for extracting edge elements for each of the two types of chrominance element image data; edge density calculation means, connected to the chrominance element edge detection means, for calculating a density of the edge elements in each block for each block for each of the two types of chrominance element image data; and resolution creation means, connected to the edge density calculation means, for creating the resolution information on each of the two types of chrominance element image data based on the density.

The resolution during the reduction is obtained based on the density of the edges of the chrominance element in each block. If the positions of the edges of the chrominance element are shifted due to the reduction of the block, color deviation may possibly occur. Considering this, it is possible to prevent color deviation by not reducing a block including many edges.

It is more preferable that the resolution determination processing section sets the resolution of each of the plurality of blocks in accordance with a degree of influence when the luminance element image data and the two types of chrominance element image data are converted into red element image data, green element image data and blue element image data, respectively, for each block, and creates the resolution information.

During decoding, the luminance element image data and two types of chrominance element image data are sometimes converted into image data of red, blue and green elements. At this moment, the resolution is determined so as to reduce the block of the luminance element data or two types of chrominance element image data which is not important for conversion. By doing so, it is possible to compress image data without causing color deviation to the human eye.

An image expansion apparatus according to another aspect of the present invention is an image expansion apparatus for decoding the resolution information and the data for encoding encoded by the image compression apparatus stated above, and repeating luminance element image data and two types of chrominance element image data, which apparatus includes: a resolution information data decoder decoding the resolution information encoded; a data decoder decoding the data for encoding encoded; and an image creation processing section connected to the resolution information data decoder and the data decoder, enlarging the data for encoding to have a resolution before reduction based on the resolution information, and creating the luminance element image data and the two types of chrominance element image data.

It is possible to decode an encoded image without causing color deviation to the eye.

A computer readable recording medium according to yet another aspect of the present invention records a program for allowing a computer to execute an image compression method for compressing luminance element image data and two types of chrominance element image data each constituted out of a plurality of blocks. The image compression method includes: a step of adaptively setting a resolution of each block during reduction according to a predetermined criterion for each of the luminance element image data and the two types of chrominance element image data, and creating resolution information; a step of reducing each block based on the resolution information for each of the luminance element image data and the two types of chrominance element image data; and a step of encoding the resolution information and data of each reduced block.

If each block is reduced and then enlarged, the resolution during the reduction is set so as not to cause color deviation to the human eye. Based on the resolution, each block is reduced and encoded for each of the luminance element image data and the two types of chrominance element image data. Due to this, if data is decoded and enlarged and the luminance element image data and the two types of chrominance element image data are obtained, no color deviation occurs to the eye.

A computer readable recording medium according to yet another aspect of the present invention records a program for allowing a computer to execute an image expansion method for decoding the resolution information and the data for encoding encoded by executing the program recorded on the computer readable recording medium stated above, and repeating luminance element image data and two types of chrominance element image data. The image expansion method includes: a step of decoding the resolution information encoded; a step of decoding the data for encoding encoded; and a step of enlarging the data for encoding to have a resolution before reduction based on the resolution information, and creating the luminance element image data and the two types of chrominance element image data.

It is possible to decode an encoded image without causing color deviation to the eye.

BEST MODE FOR CARRYING OUT THE INVENTION

First Embodiment

Figure 1:
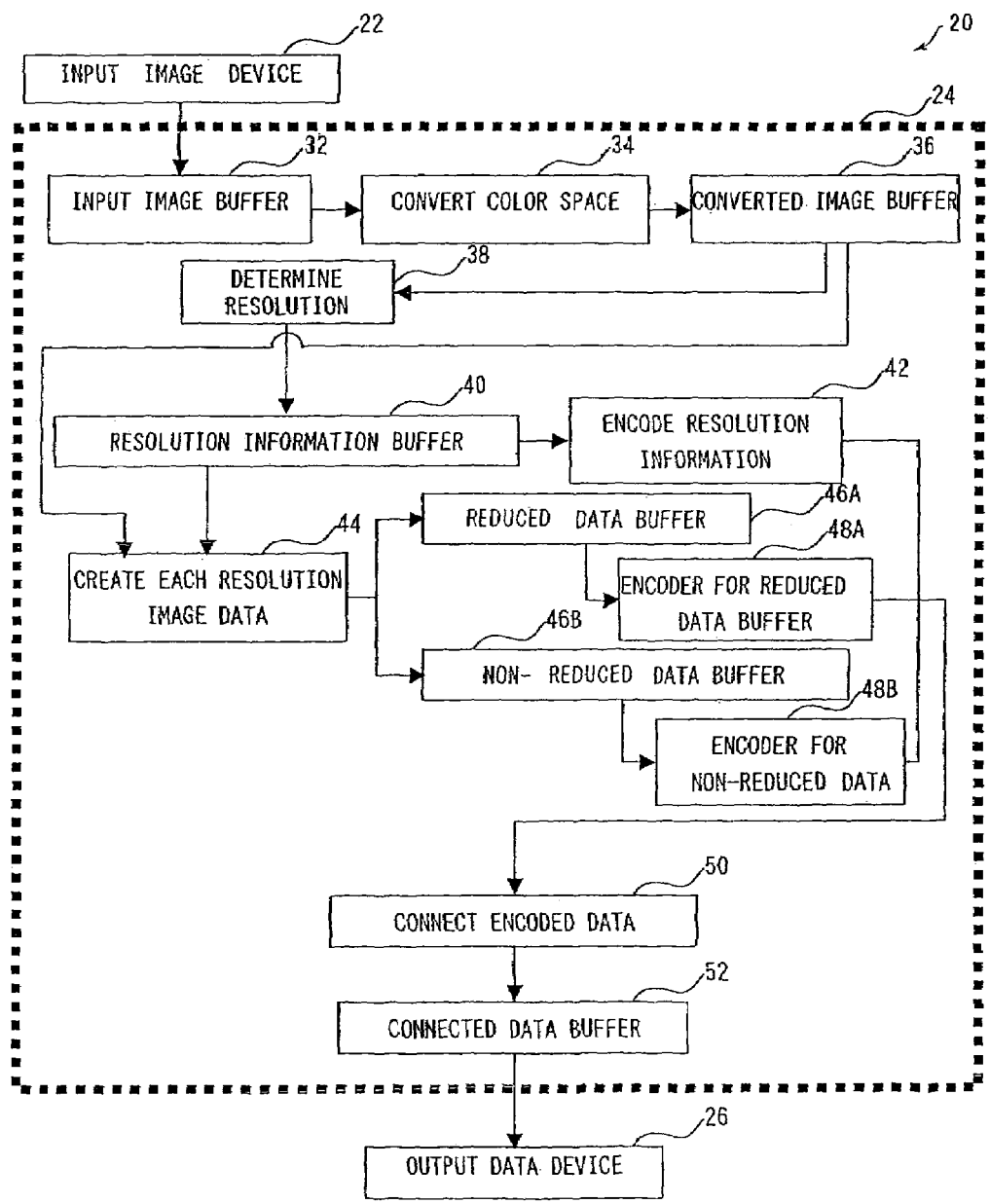
FIG. 1 is a block diagram showing the configuration of a multiple resolution image compression apparatus according to a first embodiment of the present invention.

Referring to FIG. 1, a multiple resolution image compression apparatus 20 according to a first embodiment of the present invention includes an input image device 22 inputting a color image, an image compression device 22 connected to input image device 22 and compressing color input image data with different resolutions according to respective blocks, and a output data device 26 connected to image compression device 24 and outputting final encoded data.

Image compression device 24 is includes an input image buffer 32 connected to input image device 22 and temporarily storing input image data, a color space conversion processing section 34 connected to input image buffer 32 and converting three pieces of input image data of R (Red), G (Green) and B (Blue) into image data on color spaces (YUV spaces) consisting of a luminance signal (Y) and chrominance signals (U, V), a color space converted image buffer 36 connected to color space conversion processing section 34 and temporarily storing three pieces of color space image data, a resolution determination processing section 38 connected to color space converted image buffer 36 and determining the resolution of the color space image data in accordance with a predetermined criterion to be described later for each block of each image data, a resolution information buffer 40 connected to resolution determination processing section 38 and temporarily storing the determined resolution information, and a resolution information encoding section 42 connected to resolution information buffer 40 and encoding the resolution information by certain reversible coding such as reversible encoding JBIG (Joint Bi-level Image coding experts Group) scheme.

The image compression apparatus 24 also includes a data creation processing section 44 connected to resolution information buffer 40 and color space converted image buffer 36 and creating data having each block reduced by half from each block of the color space image data (which data will be referred to as "reduced data" hereinafter) and data having the same block as each block of the color space image data (which data will be referred to as "non-reduced data" hereinafter), a reduced data buffer 46A connected to data creation processing section 44 and temporarily storing the non-reduced data, an encoder 48A for the reduced data buffer connected to reduced data buffer 46A and encoding the reduced data according to the JPEG (Joint Photographic Experts Group) scheme, an encoder 48B for the non-reduced data buffer connected to non-reduced data buffer 46B and encoding the non-reduced data according to the JPEG scheme, an encoded data connection processing section 50 connected to resolution information encoding processing section 42, reduced data encoder 48A and non-reduced data encoder 48B and connecting the JPEG-encoded resolution information, reduced data and non-reduced data to one another to thereby provide one data, and a connected encoded data buffer 52 connected to encoded data connection processing section 50, temporarily storing the encoded data which are connected (to be referred to as "connected encoded data" hereinafter) and outputting the connected encoded data to output data device 26.

Figure 2:
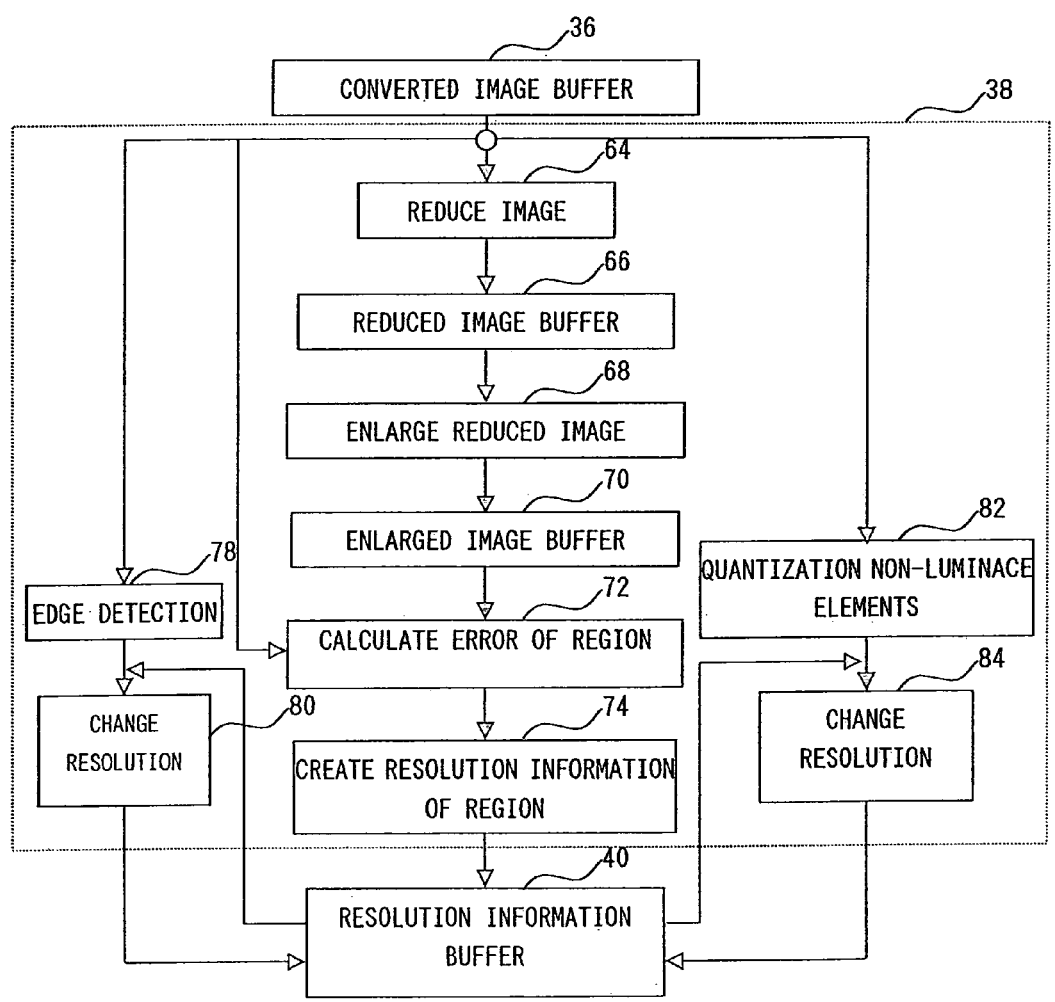
FIG. 2 is a block diagram showing the configuration of a resolution determination section according to the first embodiment.

Referring to FIG. 2, resolution determination processing section 38 includes an image reduction processing section 64 connected to color space converted image buffer 36 and reducing image data by the same method as the reduction method of data creation processing method 44 based on a plurality of preset resolutions, a reduced image buffer 66 connected to image reduction processing section 64 and temporarily storing the reduced image data, an image enlargement processing section 68 connected to reduced image buffer 66 and enlarging the reduced image data so as to have the same size as that of original image data, an enlarged image data buffer 70 connected to image enlargement processing section 68 and temporarily storing the enlarged image data region error calculation processing section 72 connected to color space converted image buffer 36 and enlarged image data buffer 70 and calculating block by block region error between the image data held by color space converted image buffer 36 and the image data held by enlarged image data buffer 70, and region resolution creation processing section 74 connected to region error calculation processing section 72, calculating best resolution information for each block based on the output of region error calculation processing section 72 and writing the resolution information to resolution information buffer 40.

Resolution determination processing section 38 further includes a chrominance element quantization processing section 82 connected to color space converted image buffer 36 and quantizing image data on chrominance elements (elements U and V) among the color space image data to 16 gradations, and a resolution information change processing section 84 connected to chrominance element quantization processing section 82 and resolution information buffer 40, calculating for each block the number of colors included in each block in accordance with the output of chrominance element quantization processing section 82 and changing the resolution information stored in resolution information buffer 40 in accordance with the number of colors.

Further, resolution determination processing section 38 includes a luminance element edge detection processing section 78 connected to color space converted image buffer 36 and detecting edge elements from image data on the luminance element (element Y) among the image data on color spaces, and a resolution information change processing section 80 connected to luminance element edge detection processing section 78 and changing the resolution information stored in resolution information buffer 40 based on the output of luminance element edge detection processing section 78.

Figure 3:
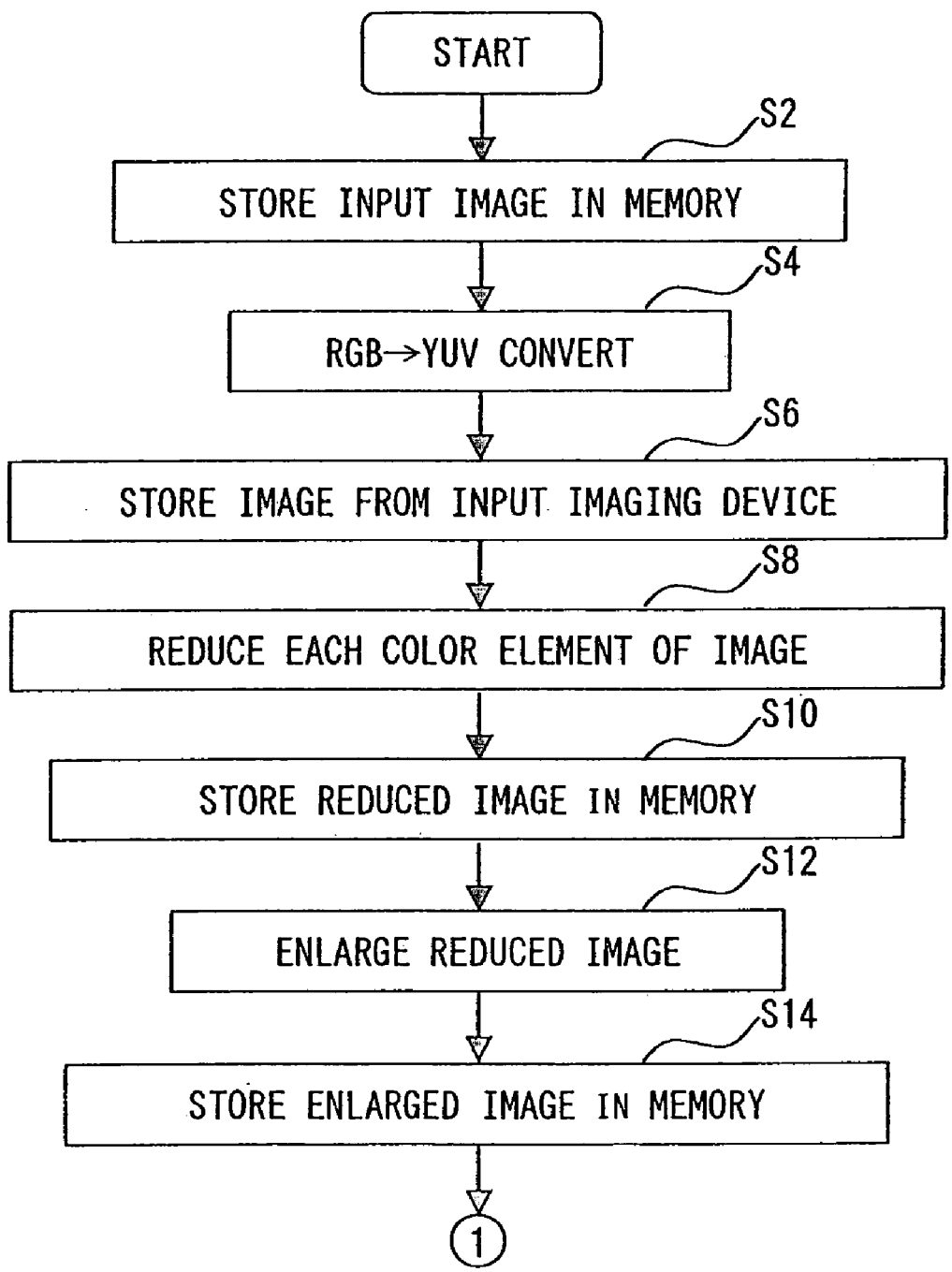
FIG. 3 is a flow chart for a multiple resolution image compression processing according to the first embodiment.
Figure 4:
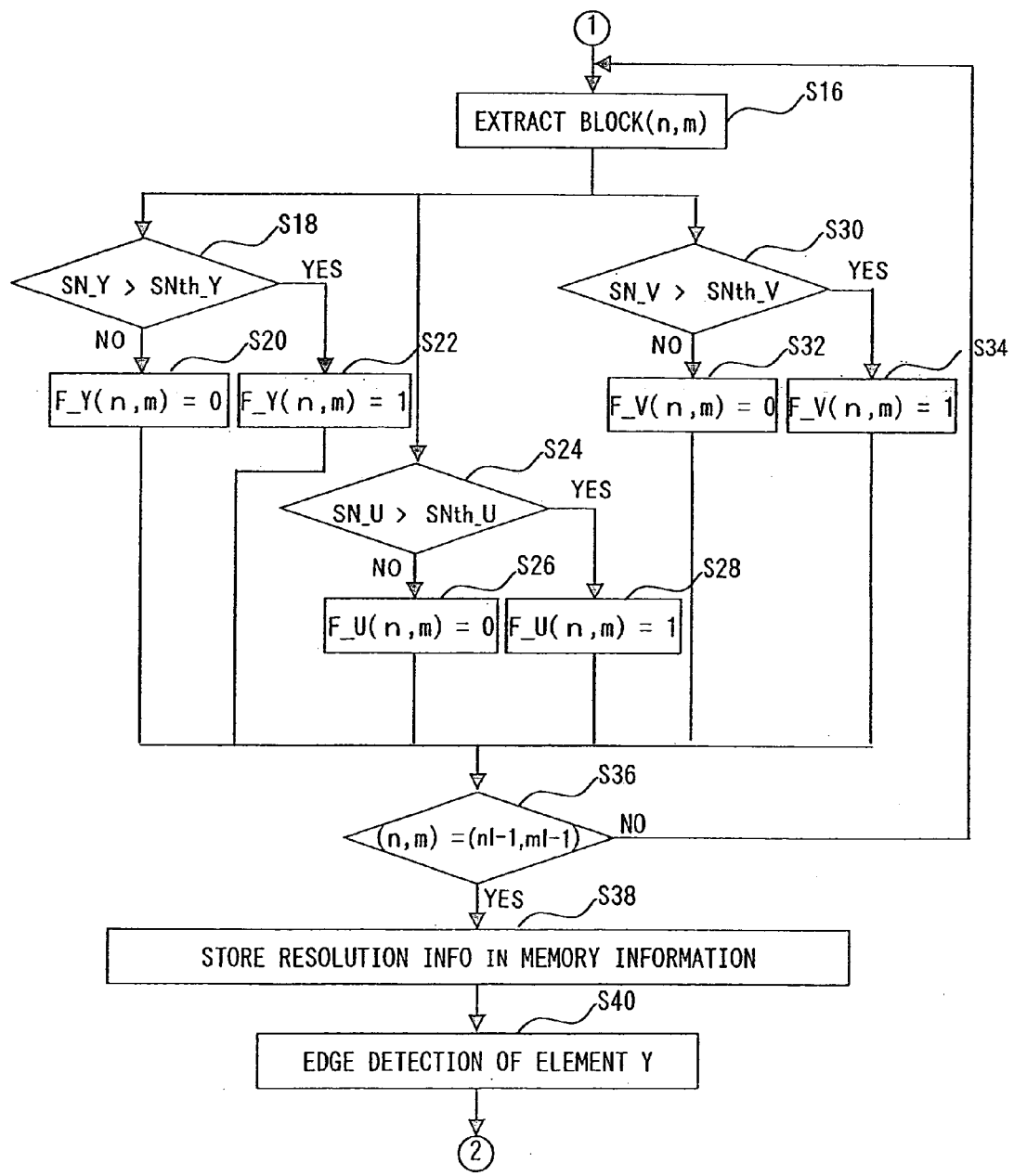
FIG. 4 is a flow chart for the multiple resolution image compression processing according to the first embodiment.
Figure 5:
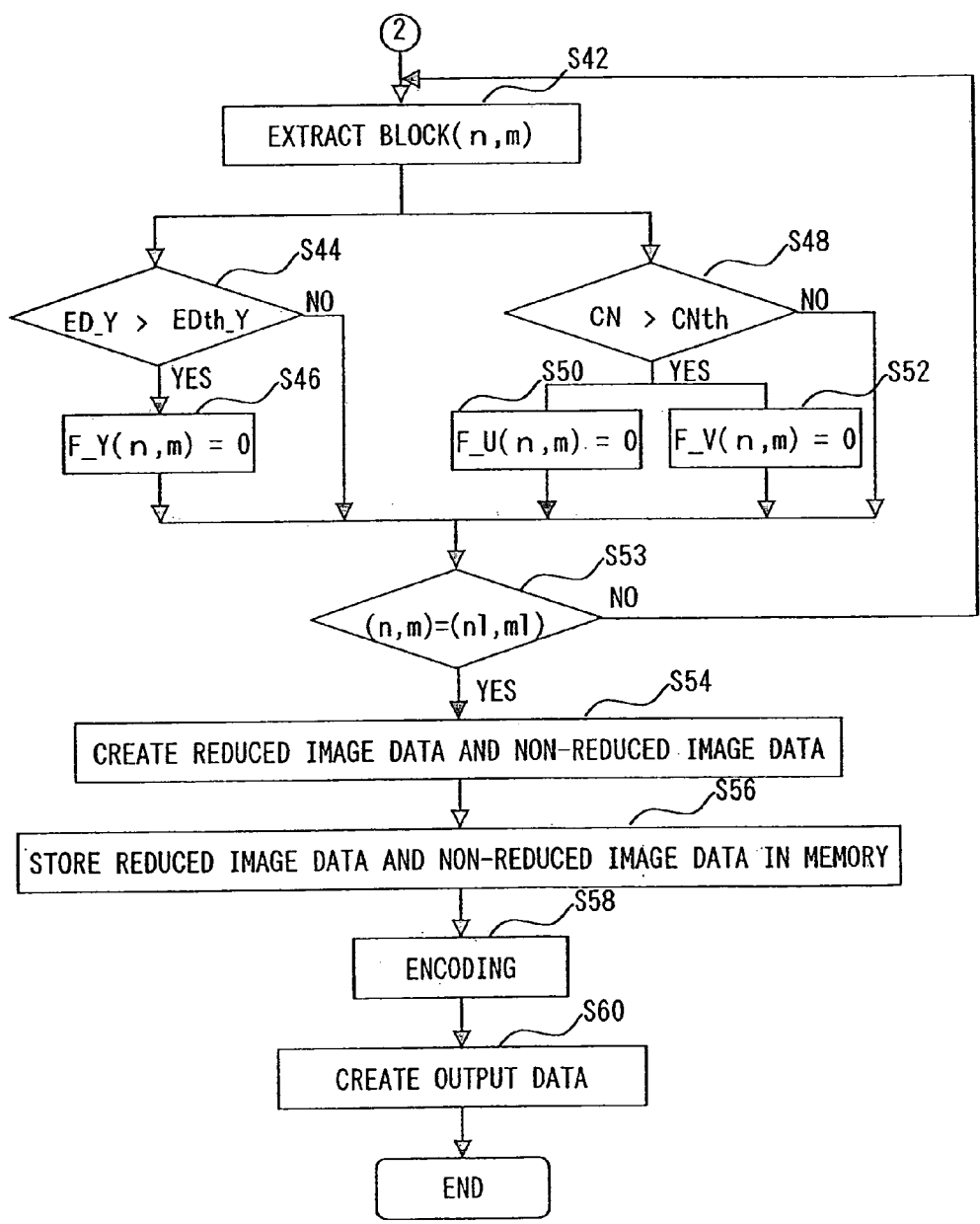
FIG. 5 is a flow chart for the multiple resolution image compression processing according to the first embodiment.

Referring to FIGS. 3 to 5, the respective sections of multiple resolution image compression apparatus 20 operate as follows. Input image device 22 inputs three pieces of input image data of R, G and B and stores the input image data in input image buffer 32 (S2). Color space conversion processing section 34 reads the three pieces of input image data stored in input image buffer 32 and converts the three pieces of input image data thus read into three pieces of image data on color spaces (YUV spaces) (S4). Color space conversion processing section 34 stores the converted three pieces of image data in color space converted image buffer 36 (S6).

Image reduction processing section 64 reads the three pieces of image data stored in color space converted image buffer 36 and reduces each image data so as to have a preset resolution (S8). It is assumed herein that a resolution is set so that image data after reduction is half as large as image data before reduction. Image reduction processing section 64 stores the reduced image data in reduced image data buffer 66 (S10). Image enlargement processing section 68 reads the reduced image data from reduced image data buffer 66 and enlarges the reduced image data so as to have the same size as that of the image data before reduction (S12). Image enlargement processing section 68 stores the enlarged image data in enlarged image data buffer 70 (S14).

Figure 6:
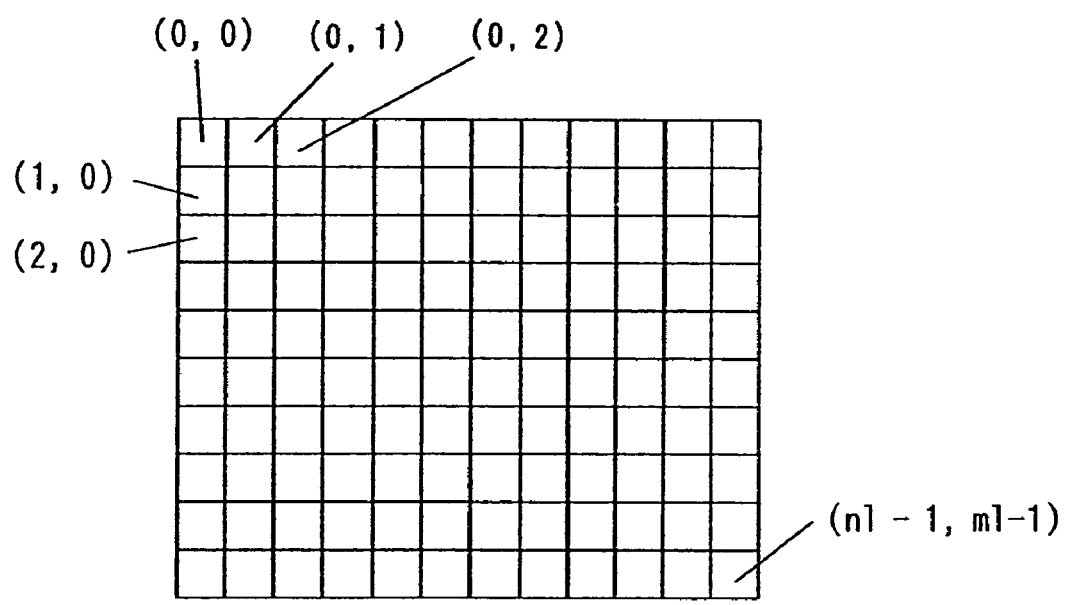
FIG. 6 is a view showing that image data is divided into a plurality of blocks.

Referring to FIG. 6, it is assumed that the three pieces of image data stored in color space converted image buffer 36 and the three pieces of enlarged image data stored in enlarged image data buffer 70 are divided into n1×m1 blocks, respectively. Region resolution creation processing section 74 extracts one block out of the n1×m1 blocks (S16). It is assumed that the position of the extracted block is (n, m). The extract order starts at (n, m)=(0, 0) and the extracting continues until (n, m)=(n1-1, m1-1) in accordance with a raster scan order.

Region error calculation processing section 72 obtains difference-square-sum SN_Y of a pixel value to be described later between the image data before reduction and the image data after reduction and enlargement for each (n, m) block of the element Y image, and region resolution creation processing section 74 determines whether or not difference-square-sum SN_Y is greater than a predetermined threshold value SNth_Y (S18).

Figure 7:
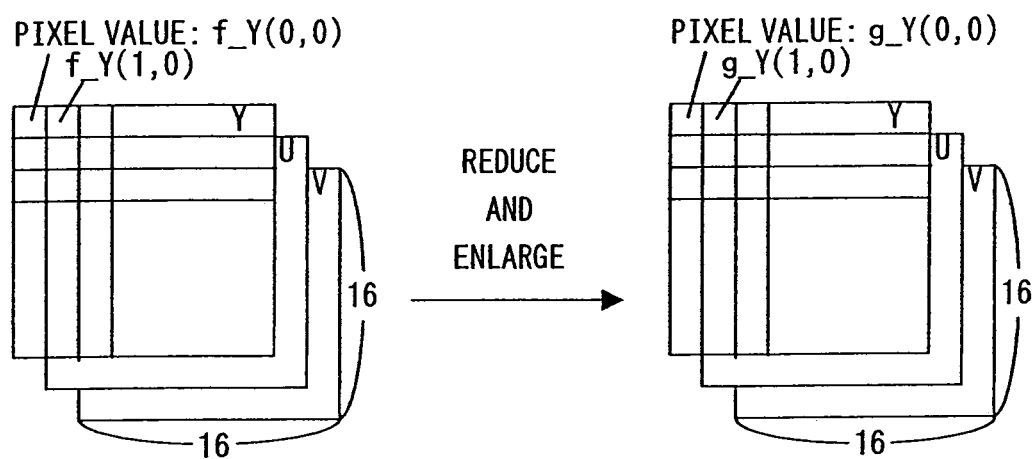
FIG. 7 is a view for describing the relationship between a block before reduction and a block after reduction and enlargement.
Figure 8:
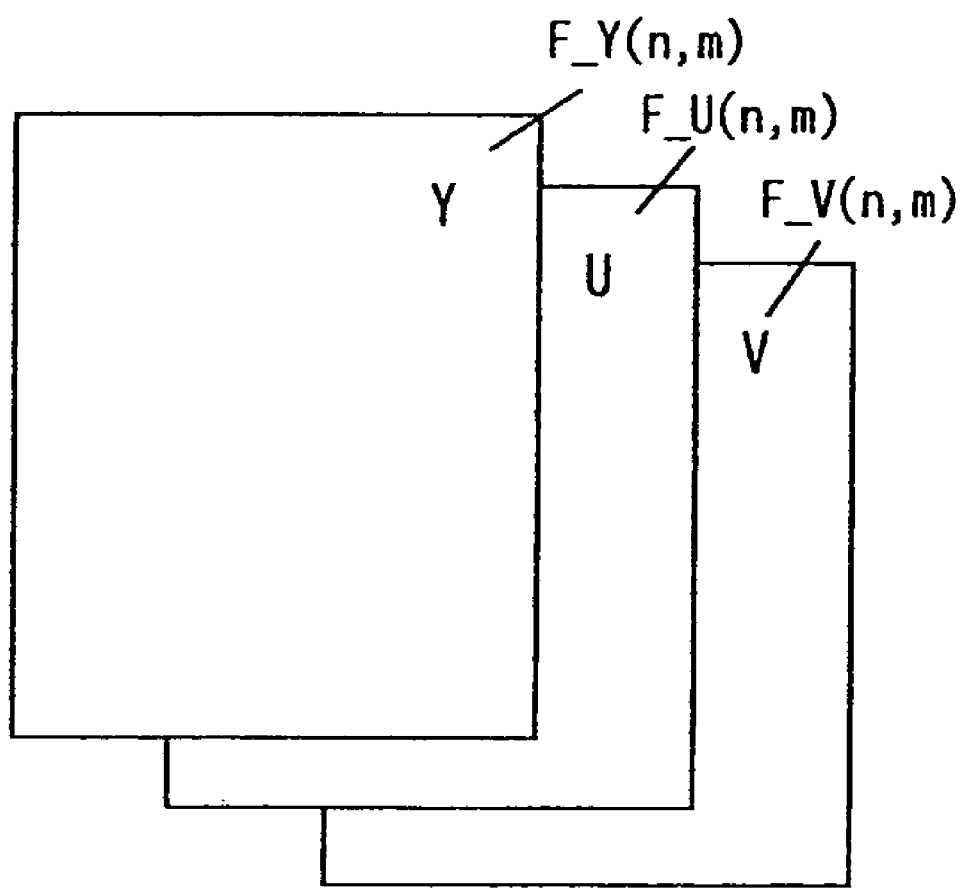
FIG. 8 is a view showing resolution information.

Referring to FIG. 7, it is assumed that each block has a size of 16×16, the pixel value of the element Y image data before reduction is expressed as f_Y(x, y) (x=0 to 15, y=0 to 15) and that the pixel value of the element Y image data after reduction and enlargement is expressed as g_Y(x, y) (x=0 to 15, y=0 to 15) for each block. Difference-square-sum SN_Y is calculated according to an equation (1). Likewise, it is assumed that the pixel values of the element U image data and the element V image data before reduction are expressed as f_U(x, y) and f_V(x, y), respectively and that the pixel values of the element U image data and the element V image data after reduction and enlargement are expressed as g_U(x, y) and g_V(x, y), respectively. Difference-square-sums SN_U and SN_V for the elements U and V are calculated according to equations (2) and (3), respectively.

$$SN\_Y = \left[\sum_{x=0}^{15}\sum_{y=0}^{15}\{f\_Y(x, y) - g\_Y(x, y)\}^2\right] / 16^2 \quad (1)$$

$$SN\_U = \left[\sum_{x=0}^{15}\sum_{y=0}^{15}\{f\_U(x, y) - g\_U(x, y)\}^2\right] / 16^2 \quad (2)$$

$$SN\_V = \left[\sum_{x=0}^{15}\sum_{y=0}^{15}\{f\_V(x, y) - g\_V(x, y)\}^2\right] / 16^2 \quad (3)$$

In parallel to the processing in S18, region resolution creation processing section 74 determines whether or not difference-square-sums SN_U and SN_V for the elements U and V are greater than predetermined threshold values SNth_U and SNth_V, respectively (S24 and S30).

If the difference-square-sum SN_Y of the element Y is greater than the threshold value SNth_Y ('YES' in S18), 1 is assigned to resolution information F_Y(n, m) on the element Y blocks (n, m) (S22). If difference-square-sum SN_Y is not greater than threshold value SNth_Y ('NO' in S18), 0 is assigned to resolution information F_Y(n, m) (S20). The resolution information of 0 represents that even if the reduced image is enlarged back to the original image, there is a small error between the reduced image and the original image. This, therefore, indicates that the image data can be reduced. Also, the resolution information of 1 represents that the image data cannot be reduced.

Likewise, if difference-square-sum SN_U for the element U is greater than threshold value SNth_U('YES' in S24), 1 is assigned to resolution information F_U(n, m) on the element U blocks (n, m) (S28). If difference-square-sum SN_U is not greater than threshold value SNth_U ('NO' in S24), 0 is assigned to resolution information F_U(n, m) (S26).

If difference-square-sum SN_V for the element V is greater than threshold value SNth_V ('YES' in S30), 1 is assigned to resolution information F_V(n, m) on the element V blocks (n, m) (S34). If difference-square-sum SN_V is not greater than threshold value SNth_V ('NO' in S30), 0 is assigned to resolution information F_V(n, m) (S32).

Region resolution creation processing section 74 determines whether or not the presently processed block is the last block (n1-1, m1-1) (S36). If the presently processed block is not the last block (n1-1, m1-1) ('NO' in S36), the processings after S16 are repeated.

If the presently processed block is the last block (n1-1, m1-1)('YES' in S36), region resolution creation processing section 74 writes resolution information F_Y(n, m), F_U(n, m) and F_V(n, m) obtained by the processings in S18 to S34 to resolution information buffer 40 (S38).

Luminance element edge detection processing section 78 detects edge elements (S40) by applying Sobel filter to the element Y image data stored in color space converted image buffer and extracts. Resolution information change processing section 80 extracts one block out of the n1×m1 blocks as in the case of the processing in S16 (S42).

Resolution information change processing section 80 determines whether or not an edge density ED_Y of the edges included in each element Y block (n, m) is greater than a predetermined threshold value EDth_Y (S44). Edge density ED_Y means the number of edge elements having values exceeding a predetermined threshold value among edge elements included in a certain block. If edge density ED_Y of element Y is greater than threshold value EDth_Y ('YES' in S44), 0 is assigned to resolution information F_Y(n, m) (S46). Namely, this indicates that the image data can be reduced.

In parallel to the processing in S44 to S46, chrominance element quantization processing section 82 obtains the number of colors CN included in each block (n, m) by a method to be described later and determines whether or not the obtained number of colors CN is greater than a predetermined threshold value CNth (S48). If the obtained number of colors is greater than the predetermined threshold value, 0 is assigned to resolution information F_U(n, m) and F_V(n, m), respectively (S50 and S52). Namely, this represents that the image data can be reduced.

Figure 9:
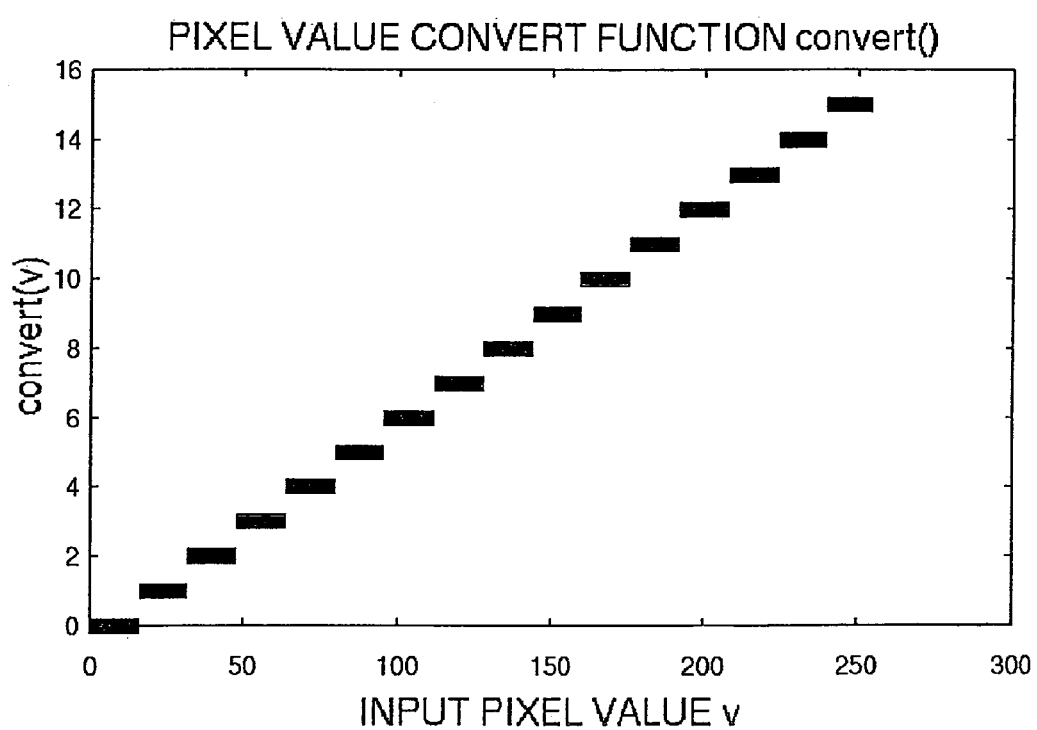
FIG. 9 is a view for describing a function convert 0.

Here, a method for calculating the number of colors included in one block will be described. It is assumed that pixel values f_U(x, y) and f_V(x, y) for the elements U and V can take values in a range of 0 to 255, respectively. At this moment, function convert ( ) is defined as shown in FIG. 9. Namely, function convert ( ) is a function for quantizing values of 256 levels to values of 16 levels. A color number 'color (x, y)' of each pixel (x, y) in each block (n, m) is defined as shown in the following equation (4):

$$\text{color}(x, y) = \text{convert}(f\_U(x, y)) + [\text{convert}(f\_V(x, y)) + 1] \times 6 \quad (4).$$

The number of colors CN included in each block (n, m) is defined as the number of types of color(x, y) included in each block (n, m) and the number of colors CN is obtained.

Resolution information change processing section 84 determines whether or not the presently processed block is the last block (n1-1, m1-1) (S53). If the presently processed block is not the last block (n1-1, m1-1) ('NO' in S53), the processings after S42 are repeated.

If the presently processed block is the last block (n1-1, m1-1) ('YES' in S53), data creation processing section 44 creates reduced data and enlarged data for each element based on resolution information F_Y, F_U and F_V and the image data on elements Y, U and V held by color space converted image buffer 36 (S54).

Figure 10:
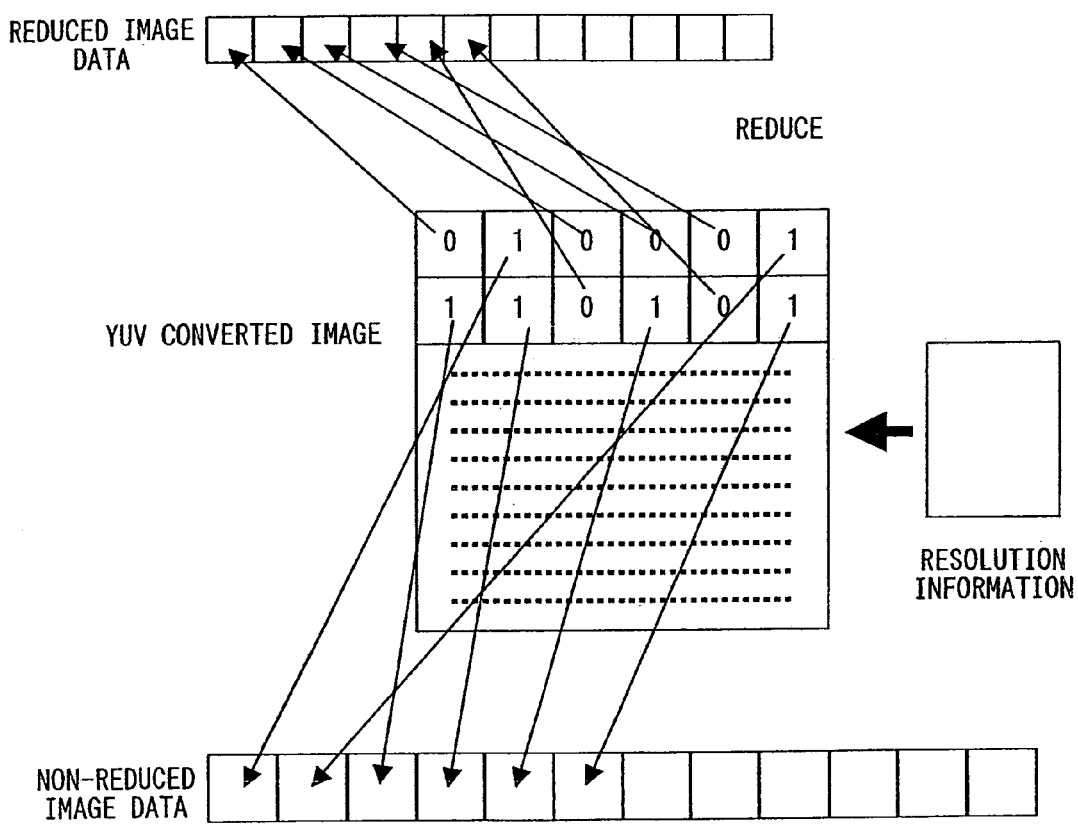
FIG. 10 is a view for describing a method for creating reduced data and non-reduced data.

Referring to FIG. 10, a method for creating reduced data and non-reduced data will be described. Blocks each having resolution information of 0 are extracted from resolution information F_Y on the element Y, and corresponding blocks from the element Y image data are reduced by half and arranged to thereby create reduced data. Also, blocks each having resolution information of 1 are extracted from resolution information F_Y, and corresponding blocks are selected from the element Y image data and arranged to thereby create non-reduced data. Likewise, non-reduced data and reduced data are created for each of the elements U and V.

Data creation processing section 44 stores the reduced data in reduced data buffer 46A and the non-reduced data in non-reduced data buffer 46B (S56).

Figure 11:
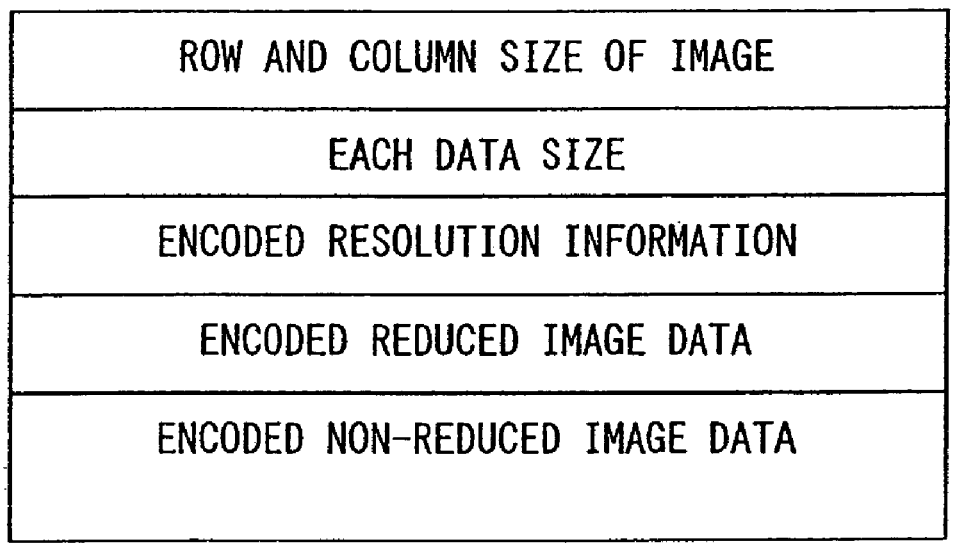
FIG. 11 is a view for describing connected encoded data.

Encoder 48A for reduced data buffer and encoder 48B for non-reduced data buffer read the reduced data and non-reduced data from reduced data buffer 46A and non-reduced data buffer 46B, respectively and encode the read data according to the JPEG scheme. Also, resolution information encoding processing section 42 reads resolution information from resolution information buffer 40 and encodes the read data according to the JBIG scheme in a reversible format (S58). Encoded data connection processing section 50 connects the JBIG-encoded resolution information obtained from resolution information encoding processing section 42, encoder 48A for reduced data buffer and encoder 48B for non-reduced data buffer and the JPEG-encoded reduced data and non-reduced data to one another to thereby obtain connected encoded data as shown in FIG. 11 and writes the obtained data to connected data buffer 52. Thereafter, output data device 26 reads the connected encoded data from connected data buffer 52 and outputs the read data (S60).

Figure 12:
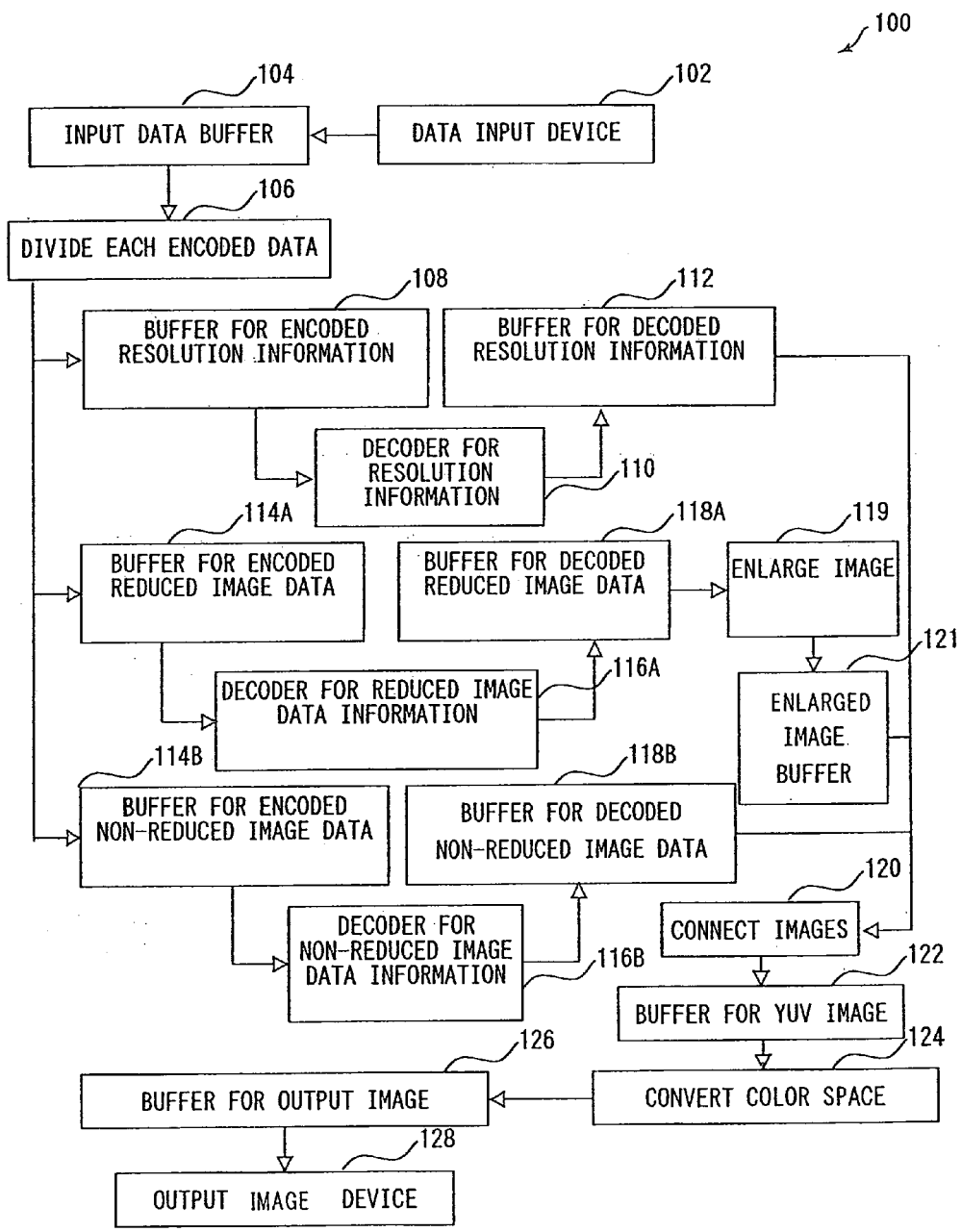
FIG. 12 is a block diagram showing the configuration of a multiple resolution image expansion apparatus.

Referring to FIG. 12, a multiple resolution image expansion apparatus according to this embodiment includes a data input device 102 inputting the connected encoded data created by multiple resolution image compression apparatus 20, an input data buffer 104 connected to data input device 102 and temporarily storing the connected encoded data thus inputted, and an encoded data division processing section 106 connected to input data buffer 104, reading the connected encoded data stored in input data buffer 104 and dividing the connected encoded data into the encoded resolution information, the encoded reduced data and the encoded non-reduced data.

Also, multiple resolution image expansion device 100 includes a buffer 108 for encoded resolution information connected to encoded data division processing section 106 and temporarily storing the encoded resolution information, a decoder 110 for resolution information connected to buffer 108 for encoded resolution information and decoding the encoded resolution information, a buffer 112 for decoded resolution information connected to decoder 110 for resolution information and temporarily storing the decoded resolution information, a buffer 114A for encoded reduced image data connected to encoded data division processing section 106 and temporarily storing the encoded reduced data, a decoder 116A for reduced image data information connected to buffer 114A for encoded reduced image data and decoding the encoded reduced data, a buffer 118A for decoded reduced image data connected to decoder 116A for reduced image data information and temporarily storing the decoded reduced data, a data enlargement section 119 connected to buffer 118A for decoded reduced image data and enlarging the reduced data so as to have the same size as that of original data, an enlarged data buffer 121 connected to data enlargement section 119 and temporarily storing the enlarged data, a buffer 114B for encoded non-reduced image data connected to encoded data division processing section 106 and temporarily storing the encoded non-reduced data, a decoder 116B for non-reduced image data information connected to buffer 114B for encoded non-reduced image data and decoding the encoded non-reduced data, and a buffer 118B for decoded non-reduced image data connected to decoder 116B for non-reduced image data information and temporarily storing the decoded non-reduced data.

Multiple resolution image expansion apparatus 100 further includes a resolution data connection processing section 120 connected to buffer 112 for decoded resolution information, enlarged image data buffer 121 and buffer 118B for decoded non-reduced image data, connecting the enlarged data to the non-reduced data based on the resolution information and thereby creating image data on the elements Y, U and V, a buffer 122 for YUV image data connected to resolution data connection processing section 120 and temporarily storing the image data on the elements Y, U and V, an image conversion processing section 124 connected to buffer 122 for YUV image data and converting image data on the elements Y, U and V into image data on elements R, G and B, a buffer 126 for output image data connected to image conversion processing section 124 and temporarily storing the image data on the elements R, G and B, and an output image device 128 connected to buffer 126 for output image data and outputting the image data stored in buffer 126 for output image data.

Figure 13:
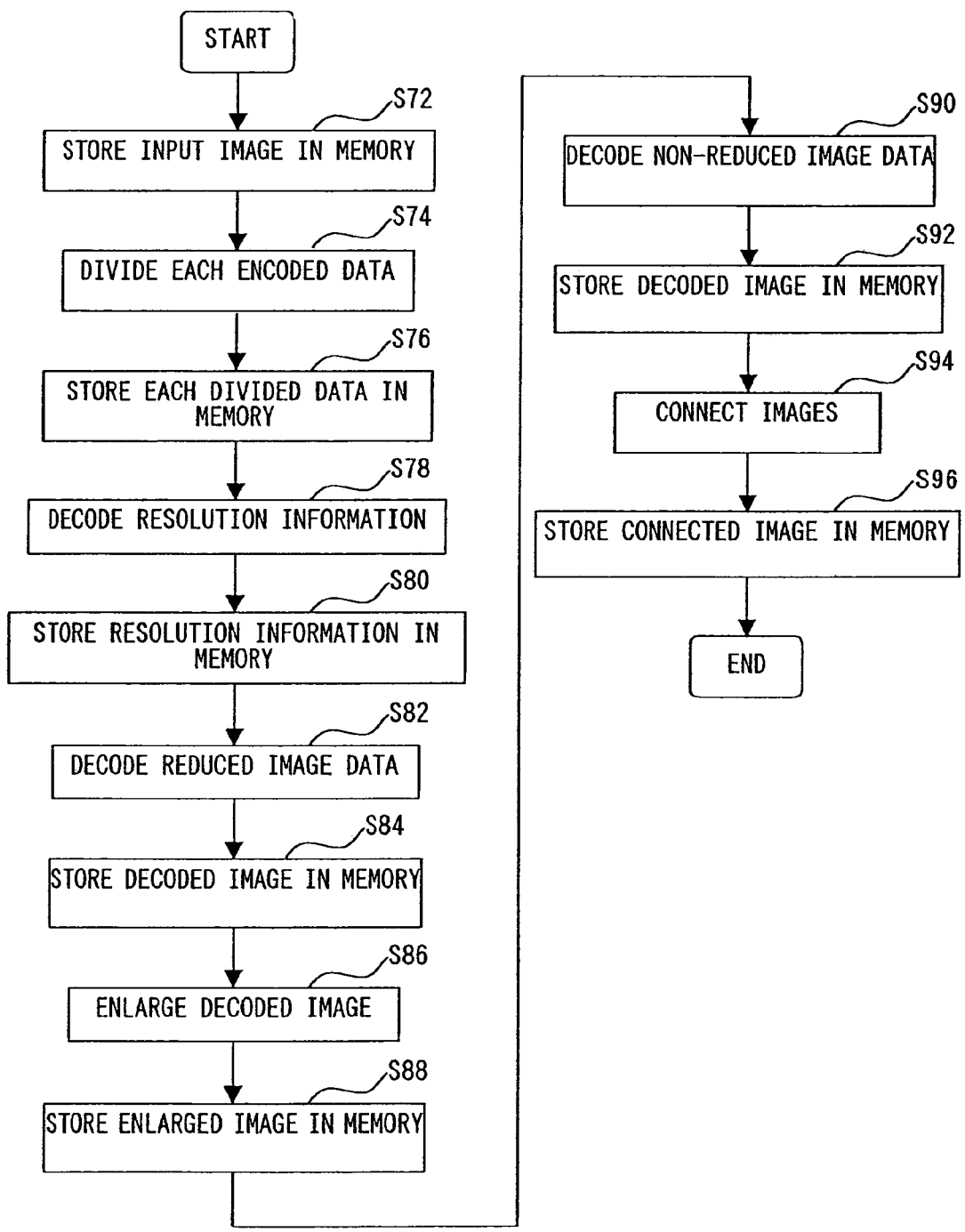
FIG. 13 is a flow chart for a multiple resolution image expansion processing.

Referring to FIG. 13, the respective sections of multiple resolution image expansion apparatus 100 operate as follows. Data input device 102 inputs the connected encoded data created by multiple resolution image compression apparatus 20 and stores the connected encoded data thus inputted in input data buffer 104 (S72). Encoded data division processing section 106 divides the connected encoded data stored in input data buffer 104 into resolution information, reduced data and non-reduced data (S74). Encoded data division processing section 106 stores the resolution information, the reduced data and the non-reduced data in buffer 108 for encoded resolution information, buffer 114A for encoded reduced image data and buffer 114B for encoded non-reduced image data, respectively (S76).

Decoder 110 for resolution information decodes the resolution information stored in buffer 108 for encoded resolution information (S78). Decoder 110 for resolution information stores the decoded resolution information in buffer 112 for decoded resolution information (S80). Decoder 116A for reduced image data information decodes the reduced data stored in buffer 114A for encoded reduced image data (S82). Decoder 116A for reduced image data information stores the decoded reduced data in buffer 118A for decoded reduced image data (S84). Data enlargement section 119 enlarges the reduced data stored in buffer 118A for decoded reduced image data by two times and creates data of original size (S86). Data enlargement section 119 stores the data of original size in enlarged image data buffer 121 (S88).

Figure 14:
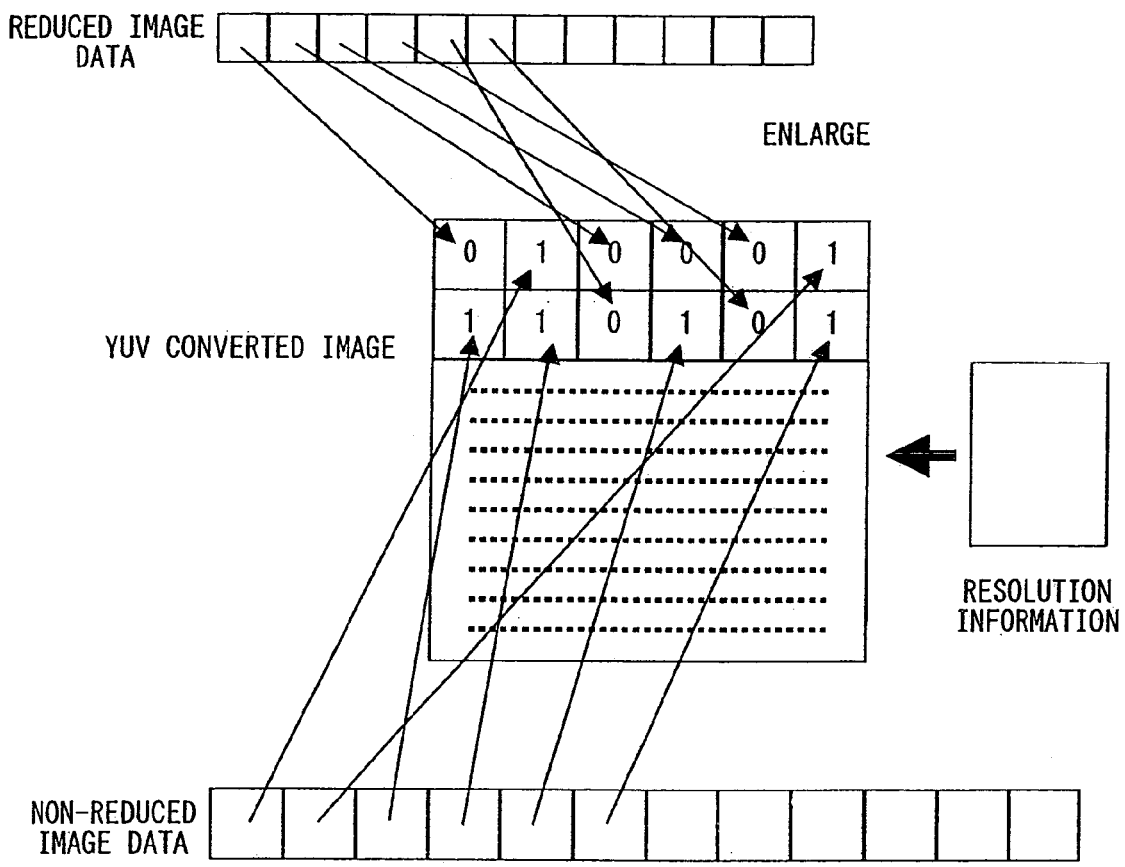
FIG. 14 is a view for describing a method for creating image data on elements Y, and V by connecting enlarged data to non-reduced data.

Decoder 116B for non-reduced image data information decodes the non-reduced data stored in buffer 114B for encoded non-reduced image data (S90). Decoder 116B for non-reduced image data information stores the decoded non-reduced data in buffer 118B for decoded non-reduced image data (S92). Referring to FIG. 14, resolution data connection processing section 120 connects the enlarged data to the non-reduced data based on the resolution information stored in buffer 112 for decoded resolution information to thereby create image data on elements Y, U and V, and stores the image data thus created in buffer 122 for YUV image data (S94). Image conversion processing section 124 converts the image data on the elements Y, U and V stored in buffer 122 for YUV image data into image data on elements R, G and B, creates output image data and then stores the output image data in buffer 126 for output image data. Thereafter, output image device 128 outputs the output images stored in buffer 126 for output image data (S96).

As stated so far, multiple resolution image compression apparatus 200 according to this embodiment reduces image data for each block and, if the error between enlarged image data and original image data is small, reduces image data in the block. Also, if many colors are mixed in a block, a person cannot grasp a graphic form in the block as an object such as a character. In addition, a character is often expressed with a single color and if many colors are mixed, a graphic form in a block is not, highly likely, a character. Due to this, even if slight color deviation occurs in a portion in which many colors exist, a person tends not to notice it. In case of such a block, therefore, image data is reduced. Further, a character includes many edges. Due to this, it is highly likely that a block in which the edges of chrominance elements are not concentrated does not include a character and image data in the block is, therefore, reduced. As a result, it is possible to compress an image without causing color deviation to the eye. The image compression method according to this embodiment is particularly effective for image data including a character.

It is noted that the edges of chrominance elements (elements U and V) may be detected for each block, the density of edges (sum of the absolute values of the intensities of edge elements) in blocks may be calculated and image data may be reduced in such a block as to have an edge density not greater than a threshold value. If the position of a chrominance edge is deviated due to the reduction of a block, color deviation may possibly occur. Considering this, in a block including many edges, image data is not reduced to thereby prevent color deviation. A determination as to whether or not image data is reduced based on the density of the edges of chrominance elements may be used simultaneously and in combination with the above-stated three methods or may be used independently thereof.

While description has been given to the same resolution as that of an original image and the resolution of an image reduced by half from the original image as resolutions in the embodiment stated above, it goes without saying that the other resolutions are applicable. Further, more resolutions may be preset and it may be determined whether or not image data can be reduced using the above-stated determination methods based on each resolution. If it is determined that image data can be reduced based on a plurality of resolutions, each block of the image data may be reduced based on a resolution with which the size of the image data becomes the smallest.

Furthermore, while resolution information is encoded according to the JBIG scheme, any encoding method may be used as long as the method is based on a reversible compression scheme such as Huffman method. In addition, reduced data and non-reduced data may be compressed by any compression scheme.

Needless to say, not only the edge detection method using a Sobel filter but also the other edge detection methods using the other filters such as Canny filter.

Second Embodiment

Figure 15:
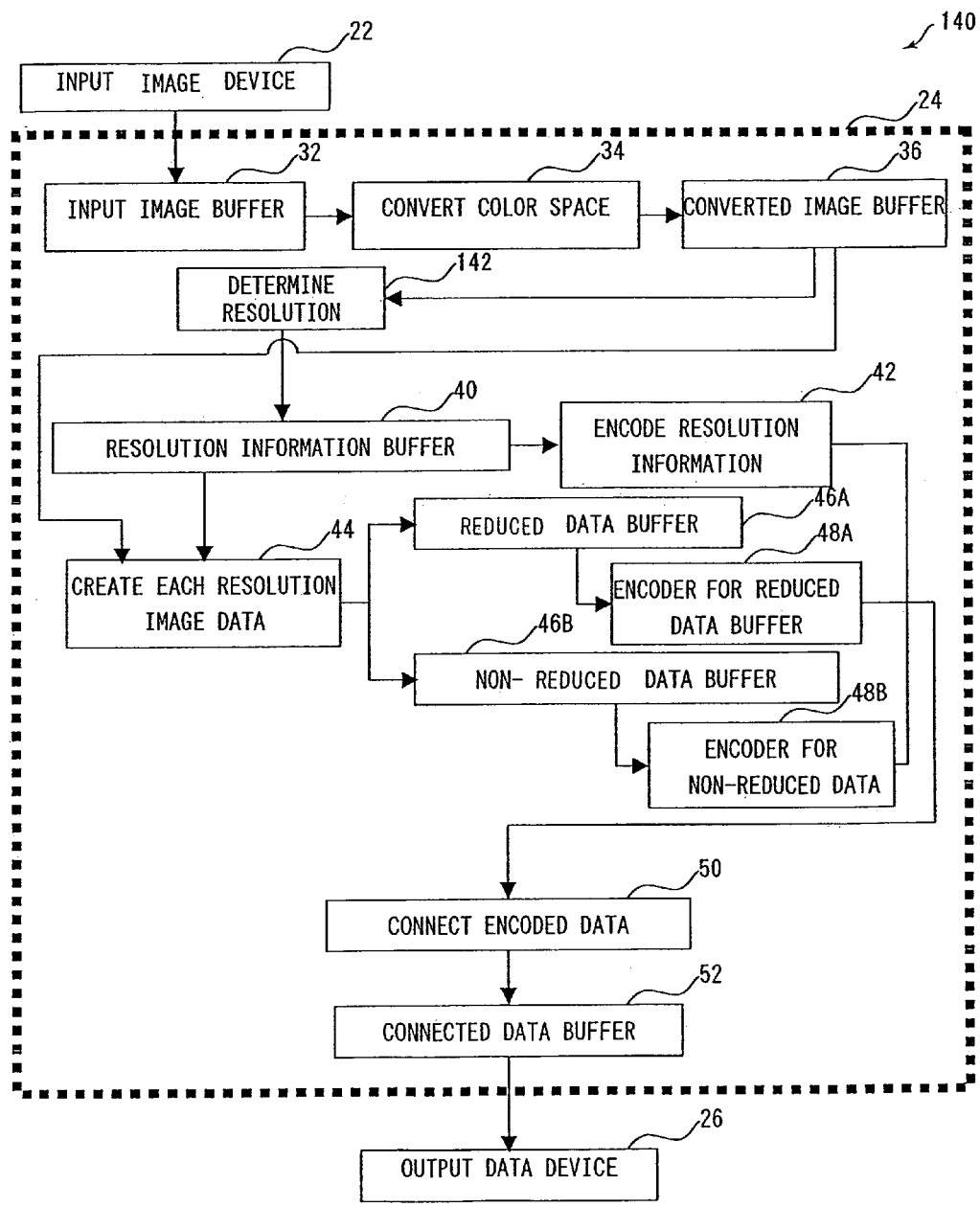
FIG. 15 is a view showing the configuration of a multiple resolution image compression apparatus according to a second embodiment.

Referring to FIG. 15, a multiple resolution image compression apparatus 140 according to this embodiment is almost the same in hardware configuration as multiple resolution image compression apparatus 20 described with reference to FIG. 1. Multiple resolution image compression apparatus 140 differs from multiple resolution image compression apparatus 20 in that a resolution determination processing section 142 determining a resolution so as not to cause color deviation when image data is converted into image data of RGB spaces is employed instead of resolution determination processing section 38. Since the other constituent elements are the same as those of multiple resolution image compression apparatus 20, no detail description thereto will be repeated herein.

Figure 16:
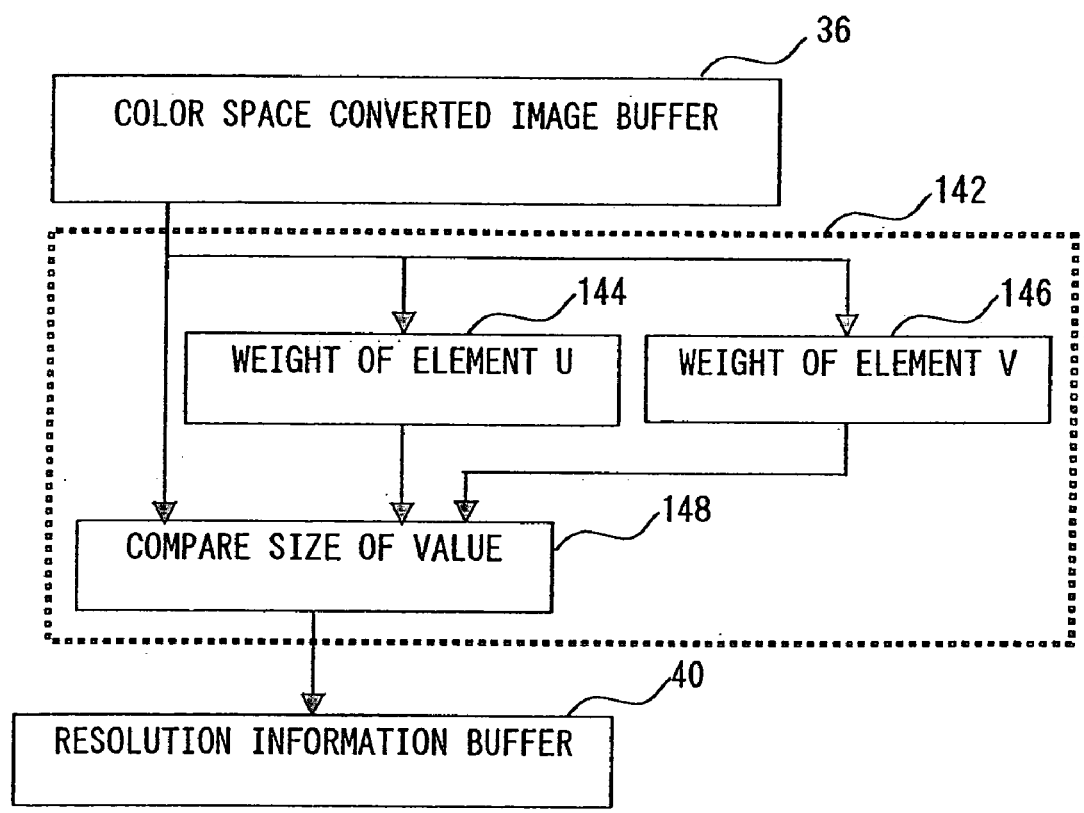
FIG. 16 is a view showing the configuration of a resolution determination section according to the second embodiment.

Referring to FIG. 16, resolution determination processing section 142 includes a element U weight section 144 connected to a color space converted image buffer 36, multiplying the pixel value of each pixel of element U image data by a preset coefficient and weighing the element U, an element V weight section 146 connected to color space converted image buffer 36, multiplying the pixel value of each pixel of element V image data by a preset coefficient and weighing the element V, and a size comparison section 148 connected to color space converted image buffer 36, element U weight section 144 and element V weight section 146, comparing the weight-added elements U and V with the element Y according to a method to be described later, calculating the best resolution for each block and writing the calculated resolutions to resolution information buffer 40.

Resolution determination processing section 142 according to this embodiment determines that a block in image data on an unimportant element can be reduced and a block in image data on an important element cannot be reduced when each block in image data on YUV spaces is returned to image data on RGB spaces. If the pixel values of the coordinates (x, y) of image data on RGB spaces are set at f_R(x, y), f_G(x, y) and f_B(x, y), respectively, and the pixel values of the coordinates (x, y) of image data on YUV spaces are set at f_Y(x, y), f_U(x, y) and f_V(x, y), respectively, then relationships expressed by equations (5) to (7) are established.

From equations (5) to (7), the maximum of the absolute value of the coefficient of pixel value f_Y(x, y) is 1. Also, the maximum of the absolute value of the coefficient of pixel value f_U(x, y) is 1.772. Further, the maximum of the absolute value of the coefficient of pixel value f_V(x, y) is 1.402. Accordingly, if equation (8) is established, it is determined that pixel value f_V(x, y) is not important and that a block for element V can be reduced. Also, if equation (9) is established, it is determined that pixel value f_U(x, y) is not important and that a block for element U can be reduced. Further, if equation (10) is established, it is determined that pixel value f_Y(x, y) is not important and that a block for element Y can be reduced.

Actually, whether or not equations (8) to (10) are established is determined depending on whether or not equations (11) to (13) are established, respectively. TH11, TH12 and TH13 represent experimentally obtained threshold values.

$$f\_R(x, y) = f\_Y(x, y) - 7.1525 \times 10^{-6} \times f\_U(x, y) + 1.402 \times f\_V(x, y) \quad (5)$$

$$f\_G(x, y) = f\_Y(x, y) - 0.34413 \times f\_U(x, y) - 0.71414 \times f\_V(x, y) \quad (6)$$

$$f\_B(x, y) = f\_Y(x, y) - 1.772 \times f\_U(x, y) + 1.5405 \times 10^{-5} \times f\_V(x, y) \quad (7)$$

$$f\_Y(x, y) + 1.772 \times |f\_U(x, y)| \gg 1.402 \times |f\_V(x, y)| \quad (8)$$

$$f\_Y(x, y) + 1.402 \times |f\_V(x, y)| \gg 1.772 \times |f\_U(x, y)| \quad (9)$$

$$1.772 \times |f\_U(x, y)| + 1.402 \times |f\_V(x, y)| \gg f\_Y(x, y) \quad (10)$$

$$\frac{f\_Y(x, y) + 1.772 \times |f\_U(x, y)|}{1.402 \times |f\_V(x, y)|} > TH11 \quad (11)$$

$$\frac{f\_Y(x, y) + 1.402 \times |f\_V(x, y)|}{1.772 \times |f\_U(x, y)|} > TH12 \quad (12)$$

$$\frac{1.772 \times |f\_U(x, y)| + 1.402 \times |f\_V(x, y)|}{f\_Y(x, y)} > TH13 \quad (13)$$

Figure 17:
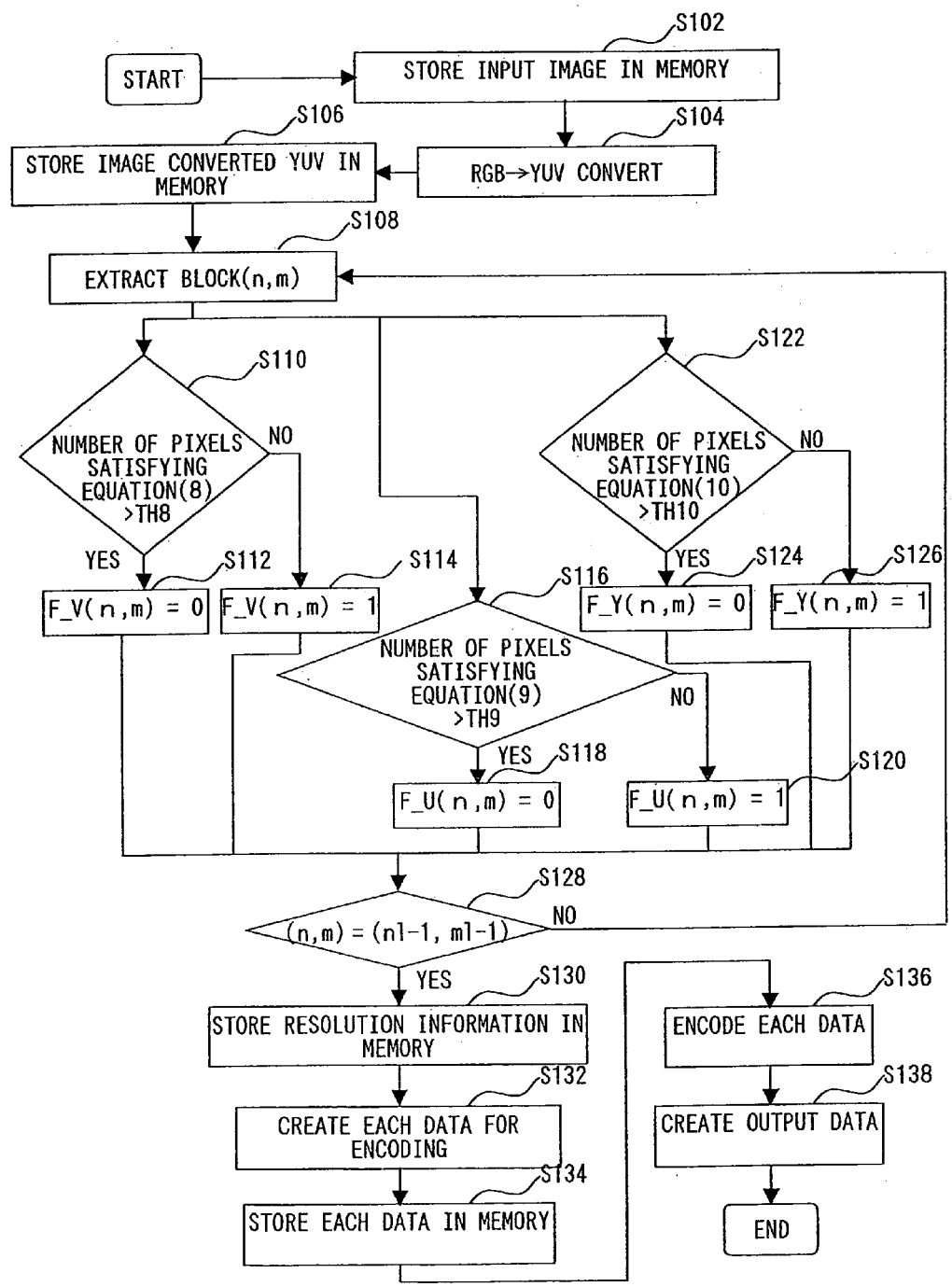
FIG. 17 is a flow chart for a multiple resolution image compression processing according to the second embodiment.

Referring to FIG. 17, the respective sections of multiple resolution image compression apparatus 140 operate as follows. Processings in S102 to S106 are the same as those in S2 to S6 shown in FIG. 3. No detailed description will be, therefore, repeated herein. It is assumed that three pieces of image data stored in color space converted image buffer 36 are divided into n1×m1 blocks, respectively. Element U weight section 144, element V weight section 146 and size comparison section 148 extract one block from the n1×m1 blocks, respectively (S108). The blocks respectively selected by element U weight section 144, element V weight section 146 and size comparison section 148 are the same.

Size comparison section 148 calculates the number of pixels satisfying equation (8) in a block using the pixel values of the weight-added element U image data, those of the weight-added element V image data and those of element Y image data stored in color space converted image buffer 36. It is determined whether or not the number of pixels satisfying equation (8) is greater than predetermined threshold value TH8 (S110). If the number of pixels satisfying equation (8) is greater than threshold value TH8 ('YES' in S110), it is possible to reduce a noted block in the element Y image data and 0 is, therefore, assigned to resolution information F_V(n, m) (S112). If the number of pixels satisfying equation (8) is not greater than threshold value TH8 ('NO' in S110), it is not possible to reduce a noted block in the element Y image data and 1 is, therefore, assigned to resolution information F_V(n, m) (S114).

In parallel to the processings in S110 to S114, size comparison section 148 calculates the number of pixels satisfying equation (9) in a block and determines whether or not the number of pixels satisfying equation (9) is greater than predetermined threshold value TH9 (S116). If the number of pixels satisfying equation (9) is greater than threshold value TH9 ('YES' in S116), it is possible to reduce a noted block in the element U image data and 0 is, therefore, assigned to resolution information F_U(n, m) (S118). If the number of pixels satisfying equation (9) is not greater than threshold value TH9 ('NO' in S116), it is not possible to reduce a noted block in the element U image data and 1 is, therefore, assigned to resolution information F_U(n, m) (S120).

Further, in parallel to the processings in S10 to S114 and the processings in S116 to S120, size comparison section 148 calculates the number of pixels satisfying equation (10) in a block and determines whether or not the number of pixels satisfying equation (10) is greater than predetermined threshold value TH10 (S122). If the number of pixels satisfying equation (10) is greater than threshold value TH10 ('YES' in S122), it is possible to reduce a noted block in the element Y image data and 0 is, therefore, assigned to resolution information F_Y(n, m) (S124). If the number of pixels satisfying equation (10) is not greater than threshold value TH10 ('NO' in S122), it is not possible to reduce a noted block in the element Y image data and 1 is, therefore, assigned to resolution information F_Y(n, m) (S126).

After the processings in S110 to S126, size comparison section 148 determines whether or not the presently processed block is the last block (n1-1, m1-1) (S128). If the presently processed block is not the last block (n1-1, m1-1) ('NO' in S128), the processings after S108 are repeated.

If the presently processed block is the last block (n1-1, m1-1) ('YES' in S128), size comparison section 148 writes resolution information F_Y(n, m), F_U(n, m) and F_V(n, m) on each block (n, m) (n=0 to n1-1, m=0 to m1-1) obtained by the processings in S110 to S126 to resolution information buffer 40 (S130).

Thereafter, processings in S132 to S138 are carried out to thereby output connected encoded data. The processings in S132 to S138 are the same as those in S54 to S60 shown in FIG. 5. No detailed description thereto will be, therefore, given herein.

By expanding the connected encoded data obtained as stated above by multiple resolution image expansion apparatus 100 similar to that in the first embodiment, it is possible to reconstitute three pieces of input images of R, G and B.

Multiple resolution image compression apparatus 140 according to this embodiment reduces image data for element Y, U or V determined not to be important for the reconstitution of image data on RGB spaces during expansion for each block. Due to this, multiple resolution image compression apparatus 140 can compress an image without causing color deviation to the eye.

In this embodiment as in the case of the first embodiment, a plurality of reduction ratios may be predetermined and whether or not image data can be reduced for each reduction ratio may be determined.

Figure 18:
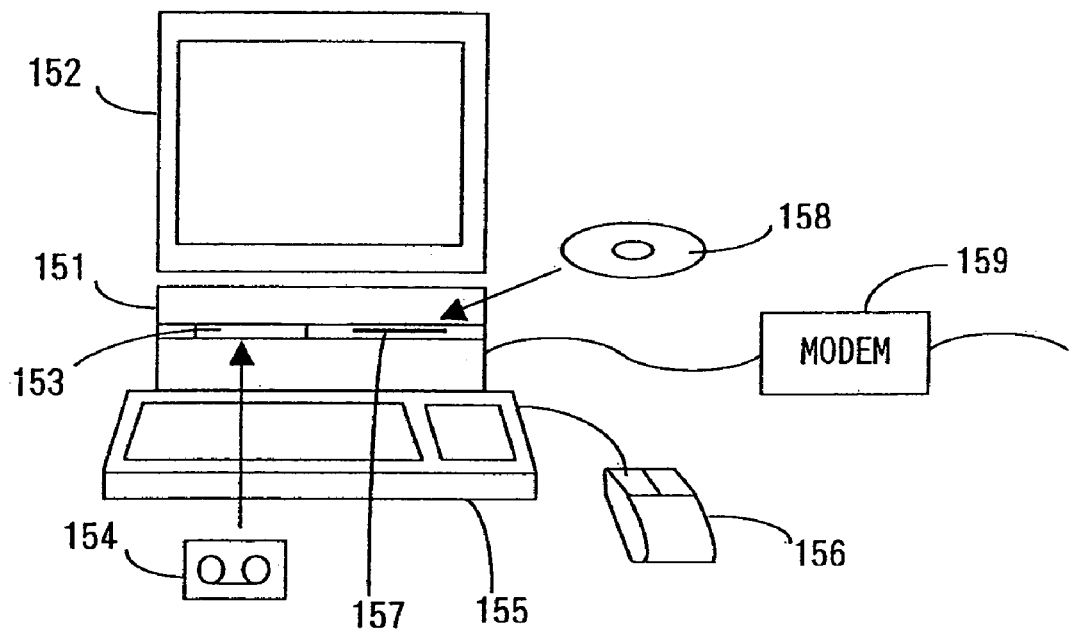
FIG. 18 is an outside view of a computer which realizes the multiple resolution image compression apparatus or the multiple resolution image expansion apparatus.

Multiple resolution image compression apparatuses 20 and 140 and multiple resolution image expansion apparatus 100 described so far can be realized by a computer. Referring to FIG. 18, each of multiple resolution image compression apparatus 20 or 140 and multiple resolution image expansion apparatus 100 includes a computer 151, a keyboard 155 and a mouse 156 for issuing an indication to computer 151, a display 152 for displaying operation results or the like of computer 151 as well as a magnetic tape device 153, a CD-ROM (Compact Disc-Read Only Memory) drive 157 and a communication modem 159 for reading programs executed by computer 151, respectively.

A program for the image compression method described with reference to FIGS. 3 to 5 and FIG. 17 and that for the image expansion method described with reference to FIG. 13 are recorded on a magnetic tape 154 or a CD-ROM 158 which is a recording medium readable by computer 151, and are read by magnetic tape device 153 or CD-ROM drive 157. Alternatively, the programs are read by communication modem 159 through a communication line.

Figure 19:
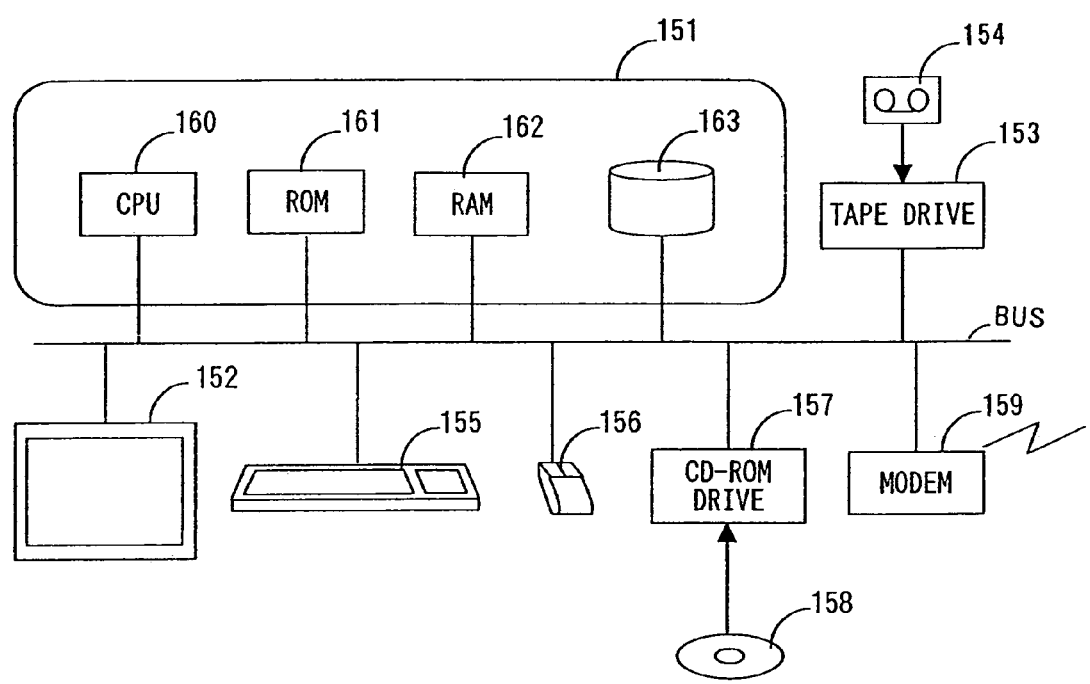
FIG. 19 is a block diagram showing the internal configuration of the computer.
Figure 20A:
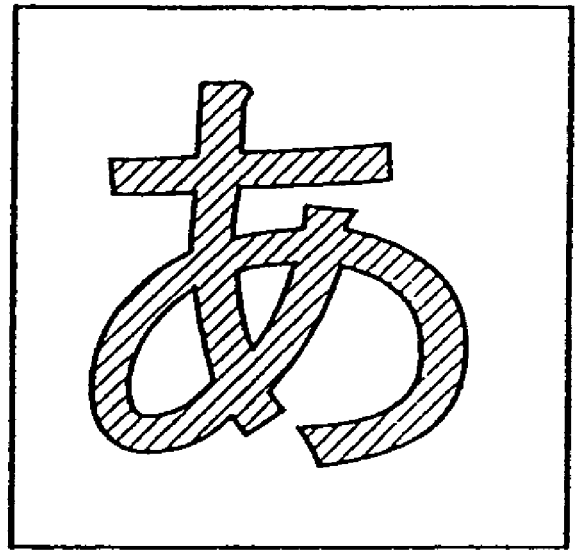
FIGS. 20A and 20B are views for describing problems with a conventional thinning-out method.
Figure 20B:
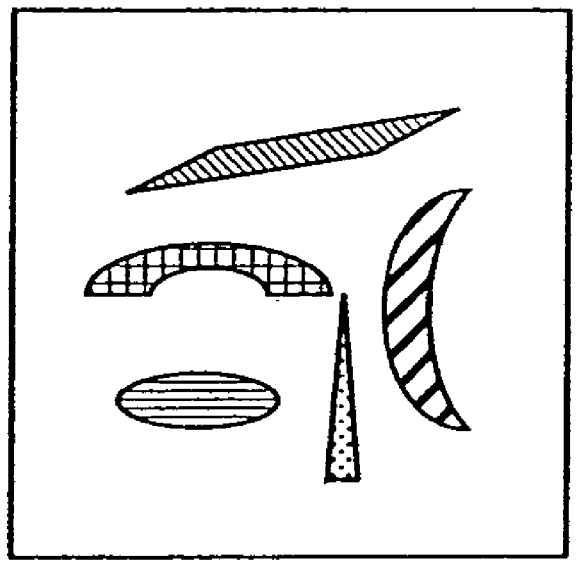

Referring to FIG. 19, computer 151 includes a CPU (Central Processing Unit) 160 for executing the programs read through magnetic tape device 153, CD-ROM drive 157 or communication modem 159, a ROM (Read Only Memory) 161 for storing other programs and data necessary for the operation of computer 151, a RAM (Random Access Memory) 162 for storing the programs as well as parameters, operation results and the like during the execution of the programs, and a magnetic disc 163 for storing the programs and data.

The programs read by magnetic tape device 153, CD-ROM drive 157 or communication modem 159 are executed by CPU 160.

INDUSTRIAL APPLICABILITY

As stated so far, the image compression apparatus according to the present invention can efficiently encode an image without causing color deviation to the eye. The image compression apparatus is, therefore, suited for encoding an image, to which color deviation tends to occur, such as a character.

What is claimed is:

1. An image compression apparatus for compressing luminance element image data and chrominance element image data by dividing each element image data into a plurality of blocks, comprising:
   a resolution determination processing section (38, 142) adaptively setting a resolution of each block during reduction according to a predetermined criterion for each of said luminance element image data and said chrominance element image data, and creating resolution information;
   a data creation processing section (44) connected to said resolution determination processing section (38, 142), and creating data having each block reduced based on said resolution information for each of said luminance element image data and said chrominance element image data; and
   an encoder (42, 48A, 48B) connected to said resolution determination section (38, 142) and said data creation processing section (44), and encoding an output of each of said resolution information and said data creation processing section (44).

2. The image compression apparatus according to claim 1, wherein
   said resolution determination processing section (38, 142) comprises:
   an image reduction processing section (64) reducing each of said plurality of blocks to have a predetermined resolution by a method same as a method of said data creation processing section (44) for each of said luminance element image data and said chrominance element image data;
   an image enlargement processing section (68) connected to said image reduction processing section (64), and enlarging each of the blocks reduced by said image reduction processing section (64) to have a resolution same as a resolution before reduction;
   region error calculation processing section (72) connected to said image enlargement processing section (68), and detecting an error between the image data in each block outputted by said image enlargement processing section (68) and the image data in each block reduced by said image reduction processing section (64); and
   a region resolution creation processing section (74) connected to said region error calculation processing section (72), determining whether each block can be reduced based on said predetermined resolution based on an output of said region error calculation processing section (72), and creating said resolution information.

3. The image compression apparatus according to claim 1, wherein
   said resolution determination processing section (38, 142) comprises:
   a luminance element edge detection processing section (78) detecting edge elements from said luminance element image data;
   an edge density calculation means (80), connected to said luminance element edge detection processing section (78), for calculating a density of the edge elements in each block for each of said plurality of blocks of said luminance element image data; and
   resolution creation means (80), connected to said edge density calculation means (80), for creating said resolution information on said luminance element image data based on said density.

4. The image compression apparatus according to claim 1, wherein
   said resolution determination processing section (38, 142) comprises:
   number-of-colors calculation means (82, 84) for obtaining the number of colors included in each block based on said chrominance element image data; and
   resolution creation means (84), connected to said number-of-colors calculation means (82, 84), for creating said resolution information on each of said two types of chrominance element image data based on an output of said number-of-colors calculation means (82, 84).

5. The image compression apparatus according to claim 1, wherein
   said resolution determination processing section (38, 142) comprises:
   chrominance element edge detection means for extracting edge elements for each of said chrominance element image data;

edge density calculation means, connected to said chrominance element edge detection means, for calculating a density of the edge elements in each block for each block for each of said chrominance element image data; and resolution creation means, connected to said edge density calculation means, for creating said resolution information on each of said chrominance element image data based on said density.

6. The image compression apparatus according to claim 1, wherein said resolution determination processing section (38, 142) sets said resolution of each of the plurality of blocks in accordance with a degree of influence when said luminance element image data and said chrominance element image data are converted into red element image data, green element image data and blue element image data, respectively, for each block, and creates said resolution information (144 to 148).

7. An image expansion apparatus for decoding the resolution information and the encoded data encoded by the image compression apparatus according to claim 1, and repeating luminance element image data and chrominance element image data, comprising:

a resolution information data decoder (110) decoding said resolution information encoded;

a data decoder decoding said encoded data encoded; and an image creation processing section (116A, 116B, 118A, 118B, 119, 121, 120) connected to said resolution information data decoder and said data decoder, enlarging said encoded data to have a resolution before reduction based on said resolution information, and creating the luminance element image data and the chrominance element image data.

8. A computer readable recording medium recording a program for allowing a computer to execute an image compression method for compressing luminance element image data and chrominance element image data by dividing each element image data into a plurality of blocks, wherein said image compression method comprises:

a step (S8 to S53, S108 to S130) of adaptively setting a resolution of each block during reduction according to a predetermined criterion for each of said luminance element image data and said chrominance element image data, and creating resolution information;

a step (S54 to S56) of reducing each block based on said resolution information for each of said luminance element image data and said chrominance element image data; and a step (S58) of encoding said resolution information and data of each reduced block.

9. The computer readable recording medium according to claim 8, wherein said step (S8 to S53, S108 to S130) of creating the resolution information comprises:

a step (S8 to S10) of reducing each of said plurality of blocks to have a predetermined resolution by a method same as a method of said step of reducing each block for each of said luminance element image data and said chrominance element image data;

a step (S12 to S14) of enlarging each of the reduced blocks to have a resolution same as a resolution before reduction;

a step (S16, S18, S24, S30, S36) of detecting an error between the image data in each enlarged block and the image data in each block before the reduction; and a step (S16 to S38) of determining whether each block can be reduced based on said predetermined resolution based on said error, and creating said resolution information.

10. The computer readable recording medium according to claim 8 wherein said step (S8 to S53, S108 to S130) of creating the resolution information comprises:

a step (S40) of detecting edge elements from said luminance element image data;

a step (S42, S44, S53) of calculating a density of the edge elements in each block for each of said plurality of blocks of said luminance element image data; and a step (S42, S44, S46, S53) of creating said resolution information on said luminance element image data based on said density.

11. The computer readable recording medium according to claim 8 wherein said step (S8 to S53, S108 to S130) of creating the resolution information comprises:

a step (S42, S48, S53) of obtaining the number of colors included in each block based on said chrominance element image data; and a step (S42, S48 to S53) of creating said resolution information on each of said two types of chrominance element image data based said number of colors.

12. The computer readable recording medium according to claim 8, wherein said step (S8 to S53, S108 to S130) of creating the resolution information comprises:

a step of extracting edge elements for each of said chrominance element image data;

a step of calculating a density of the edge elements in each block for each block for each of said chrominance element image data; and a step of creating said resolution information on each of said chrominance element image data based on said density.

13. The computer readable recording medium according to claim 8, wherein said step (S8 to S53, S108 to S130) of creating the resolution information comprises a step (S108 to S130) of setting said resolution of each of the plurality of blocks in accordance with a degree of influence when said luminance element image data and said chrominance element image data are converted into red element image data, green element image data and blue element image data, respectively, for each block, and creating said resolution information.

14. A computer readable recording medium recording a program for allowing a computer to execute an image expansion method for decoding the resolution information and the data for encoding encoded by executing the program recorded on the computer readable recording medium according to claim 8, and repeating luminance element image data and two types of chrominance element image data, wherein said image expansion method comprises:

a step (S78) of decoding said resolution information encoded;

a step (S82) of decoding said data for encoding encoded; and a step (S86) of enlarging said data for encoding to have a resolution before reduction based on said resolution information, and creating the luminance element image data and the chrominance element image data.

* * * * *